(12) United States Patent
Xu

(10) Patent No.: US 12,393,047 B2
(45) Date of Patent: Aug. 19, 2025

(54) ZOOM LENS, CAMERA MODULE, AND ELECTRONIC DEVICE

(71) Applicant: GUANGDONG OPPO MOBILE TELECOMMUNICATIONS CORP., LTD., Guangdong (CN)

(72) Inventor: Qing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 676 days.

(21) Appl. No.: 17/837,837

(22) Filed: Jun. 10, 2022

(65) Prior Publication Data

US 2022/0299788 A1    Sep. 22, 2022

Related U.S. Application Data

(63) Continuation of application No. PCT/CN2020/141298, filed on Dec. 30, 2020.

(30) Foreign Application Priority Data

Dec. 31, 2019 (CN) .......................... 201911417951.8

(51) Int. Cl.
G02B 27/64 (2006.01)
G02B 7/02 (2021.01)
(Continued)

(52) U.S. Cl.
CPC ........... *G02B 27/646* (2013.01); *G02B 7/021* (2013.01); *G02B 7/102* (2013.01); *G02B 7/1805* (2013.01);
(Continued)

(58) Field of Classification Search
CPC . G02B 7/02; G02B 7/021; G02B 7/04; G02B 7/08; G02B 7/09; G02B 7/10;
(Continued)

(56) References Cited

U.S. PATENT DOCUMENTS 4,848,884 A   7/1989 Enomoto
5,748,997 A   5/1998 Tabata et al.
(Continued)

FOREIGN PATENT DOCUMENTS

CN   1379280    11/2002
CN   101021608    8/2007
(Continued)

OTHER PUBLICATIONS

"7-bit, 8-bit, and 10-bit I2C Slave Addressing" 2 pages, Feb. 17, 2015,retrieved from Internet Archive Wayback Machine <https://web.archive.org/web/20150217023629/https://www.totalphase.com/support/articles/200349176-7-bit-8-bit-and-10-bit-i2c-slave-addressing/> (Year: 2015).*

(Continued)

*Primary Examiner* — Cara E Rakowski
(74) *Attorney, Agent, or Firm* — Hodgson Russ LLP

(57) ABSTRACT

A zoom lens, a camera module, and an electronic device are provided. A first control end and a second control end of the zoom lens respectively control a second lens assembly and a third lens assembly to move for zooming; a third control end and a fourth control end control, under a first target focal length, the third lens assembly to move for focusing, and control, under a second target focal length, the third lens assembly to move for focusing, and the first target focal length is different from the second target focal length.

20 Claims, 9 Drawing Sheets

(51) Int. Cl.
  *G02B 7/10* (2021.01)
  *G02B 7/18* (2021.01)
  *G02B 13/00* (2006.01)
  *G02B 15/14* (2006.01)
  *G03B 5/00* (2021.01)
  *G03B 13/36* (2021.01)

(52) U.S. Cl.
  CPC ......... *G02B 13/0065* (2013.01); *G02B 15/14* (2013.01); *G03B 5/00* (2013.01); *G03B 13/36* (2013.01); *G02B 15/143503* (2019.08); *G03B 2205/003* (2013.01); *G03B 2205/0046* (2013.01); *G03B 2205/0069* (2013.01)

(58) Field of Classification Search
  CPC ............... G02B 7/102; G02B 7/105; G02B 15/143–143507; G02B 15/144–144515
  See application file for complete search history.

(56) References Cited

U.S. PATENT DOCUMENTS

| | | |
|---|---|---|
| 6,430,368 B1 | 8/2002 | Hata |
| 7,236,309 B1 | 6/2007 | Hsu |
| 2004/0263997 A1* | 12/2004 | Noda ............ G02B 15/143503 359/689 |
| 2009/0153985 A1 | 6/2009 | Nagaoka et al. |
| 2010/0033834 A1* | 2/2010 | Matsusaka ........... G02B 15/177 359/682 |
| 2012/0307372 A1* | 12/2012 | Ichikawa ....... G02B 15/144511 359/680 |
| 2013/0016433 A1* | 1/2013 | Ozaki ............ G02B 15/144511 359/676 |
| 2015/0109485 A1* | 4/2015 | Ozaki .................. G02B 27/646 359/557 |
| 2015/0256731 A1 | 9/2015 | Ninomiya |
| 2016/0170189 A1* | 6/2016 | Fujimoto ........... G02B 27/0025 359/557 |
| 2016/0277670 A1 | 9/2016 | Bigioi et al. |
| 2018/0299651 A1* | 10/2018 | Yu ....................... H02K 41/0354 |
| 2019/0361323 A1* | 11/2019 | Jerby ..................... G02B 7/023 |
| 2021/0397017 A1* | 12/2021 | Jeong ................... G02B 7/1805 |

FOREIGN PATENT DOCUMENTS

| | | |
|---|---|---|
| CN | 101097289 | 1/2008 |
| CN | 101419328 | 4/2009 |
| CN | 101432651 | 5/2009 |
| CN | 101493567 | 7/2009 |
| CN | 101782679 | 7/2010 |
| CN | 202009442 | 10/2011 |
| CN | 102253569 | 11/2011 |
| CN | 102749790 | 10/2012 |
| CN | 202502330 | 10/2012 |
| CN | 103926683 | 7/2014 |
| CN | 104142569 | 11/2014 |
| CN | 204694960 | 10/2015 |
| CN | 105100581 | 11/2015 |
| CN | 105785561 | 7/2016 |
| CN | 107515459 | 12/2017 |
| CN | 107529011 | 12/2017 |
| CN | 107846546 | 3/2018 |
| CN | 108449540 | 8/2018 |
| CN | 108521544 | 9/2018 |
| CN | 108600594 | 9/2018 |
| CN | 208110149 | 11/2018 |
| CN | 108965663 | 12/2018 |
| CN | 208581286 | 3/2019 |
| CN | 109690378 | 4/2019 |
| CN | 110187463 | 8/2019 |
| CN | 110581935 | 12/2019 |
| JP | S63161439 | 7/1988 |
| JP | H01271717 | 10/1989 |
| JP | H11202377 | 7/1999 |
| JP | 2002277736 | 9/2002 |
| JP | 2006030511 | 2/2006 |
| JP | 2006106230 | 4/2006 |
| JP | 2007298832 | 11/2007 |
| JP | 2008070781 | 3/2008 |
| JP | 2013033185 | 2/2013 |

OTHER PUBLICATIONS

CNIPA, First Office Action for CN Application No. 201911417951.8, Feb. 3, 2021.
CNIPA, Second Office Action for CN Application No. 201911417951.8, Aug. 23, 2021.
CNIPA, Third Office Action for CN Application No. 201911417951.8, Jan. 25, 2022.
WIPO, International Search Report and Written Opinion for PCT/CN2020/141298, Mar. 26, 2021.
Ren et al., "The Calibration and Automatic Focusing of Zoom Vision System for Microassembly," Infrared and Laser Engineering, 2018, vol. 47, No. 11.
Lin et al., "Motorized Zoom Lens's Motor Origin Correction Method Based on Zoom Tracking Curve," Opto-Electronic Engineering, 2014, vol. 41, No. 12.
Wu et al., "A Flexible Method for Zoom Lens Calibration and Modeling Using a Planar Checkerboard," Photogrammetric and Engineering Remote Sensing, 2013, vol. 79, No. 6.
CNIPA, Notification to Grant Patent Right for Invention for CN Application No. 201911417951.8, May 19, 2022.
CNIPA, First Office Action for CN Application No. 202210822487.6, Apr. 27, 2023.

* cited by examiner

ZOOM LENS, CAMERA MODULE, AND ELECTRONIC DEVICE

CROSS-REFERENCE TO RELATED APPLICATIONS

The present application is a continuation of International Application No. PCT/CN2020/141298, filed on Dec. 30, 2020, which claims priority to Chinese Patent Application No. 201911417951.8, filed Dec. 31, 2019, the entire disclosures of which are incorporated herein by reference.

TECHNICAL FIELD

The present disclosure relates to a field of consumer electronics technologies, and more particularly to a zoom lens, a camera module and an electronic device.

BACKGROUND

In a related art, a zoom lens can change an overall focal length through a movement of a lens group. However, most of current driving chips are only suitable for focusing and optical image stabilization (also referred to as optical anti-shake) of a fixed focus lens. Due to a small moving distance range of the lens group during the focusing, an overall moving distance range of the zoom lens is also small when the optical image stabilization is realized, and even if a number of effective control bits of the driving chip is small, it can control the lens group to move with high precision.

SUMMARY

The present disclosure provides a zoom lens, a camera module and an electronic device.

A zoom lens of an embodiment of the present disclosure includes: a housing, a first lens assembly, a second lens assembly, a third lens assembly, and a first driving chip. The first lens assembly, the second lens assembly and the third lens assembly are arranged in the housing. The first lens assembly, the second lens assembly and the third lens assembly are arranged in sequential order along an optical axis of the first lens assembly. The first driving chip includes: a first control end, a second control end, a third control end and a fourth control end, the first control end is configured (i.e., structured and arranged) to control the second lens assembly to move relative to the first lens assembly along the optical axis to realize zooming of the zoom lens and the second control end is configured to control the third lens assembly to move relative to the first lens assembly along the optical axis to realize zooming of the zoom lens. The third control end is configured to control the third lens assembly to move relative to the first lens assembly along the optical axis under a first target focal length to realize focusing of the zoom lens, the fourth control end is configured to control the third lens assembly to move relative to the first lens assembly along the optical axis under a second target focal length to realize focusing of the zoom lens, and the first target focal length is different from the second target focal length.

A camera module of an embodiment of the present disclosure includes a photosensitive element, and a zoom lens. The photosensitive element is arranged on an image side of the zoom lens. The zoom lens includes: a housing, a first lens assembly, a second lens assembly, a third lens assembly, and a first driving chip. The first lens assembly, the second lens assembly and the third lens assembly are arranged in the housing. The first lens assembly, the second lens assembly and the third lens assembly are arranged in sequential order along an optical axis of the first lens assembly. The first driving chip includes: a first control end, a second control end, a third control end and a fourth control end, the first control end is configured to control the second lens assembly to move relative to the first lens assembly along the optical axis to realize zooming of the zoom lens and the second control end is configured to control the third lens assembly to move relative to the first lens assembly along the optical axis to realize zooming of the zoom lens. The third control end is configured to control the third lens assembly to move relative to the first lens assembly along the optical axis under a first target focal length to realize focusing of the zoom lens, the fourth control end is configured to control the third lens assembly to move relative to the first lens assembly along the optical axis under a second target focal length to realize focusing of the zoom lens, and the first target focal length is different from the second target focal length.

An electronic device of the present disclosure includes: a casing and the camera module of the above embodiment. The camera module is installed on the casing. The camera module includes a photosensitive element, and a zoom lens. The photosensitive element is arranged on an image side of the zoom lens. The zoom lens includes: a housing, a first lens assembly, a second lens assembly, a third lens assembly, and a first driving chip. The first lens assembly, the second lens assembly and the third lens assembly are arranged in the housing. The first lens assembly, the second lens assembly and the third lens assembly are arranged in sequential order along an optical axis of the first lens assembly. The first driving chip includes: a first control end, a second control end, a third control end and a fourth control end, the first control end is configured to control the second lens assembly to move relative to the first lens assembly along the optical axis to realize zooming of the zoom lens and the second control end is configured to control the third lens assembly to move relative to the first lens assembly along the optical axis to realize zooming of the zoom lens. The third control end is configured to control the third lens assembly to move relative to the first lens assembly along the optical axis under a first target focal length to realize focusing of the zoom lens, the fourth control end is configured to control the third lens assembly to move relative to the first lens assembly along the optical axis under a second target focal length to realize focusing of the zoom lens, and the first target focal length is different from the second target focal length.

Additional aspects and advantages of embodiments of the present disclosure will be given in part in the following description, and some will become apparent from the following description, or learned through the practice of the embodiments of the present disclosure.

BRIEF DESCRIPTION OF THE DRAWINGS

The foregoing and/or additional aspects and advantages of the embodiments of the present application will become apparent and readily understood from the description of the embodiments in connection with the accompanying drawings below, wherein.

DETAILED DESCRIPTION OF EMBODIMENTS

Figure 1:
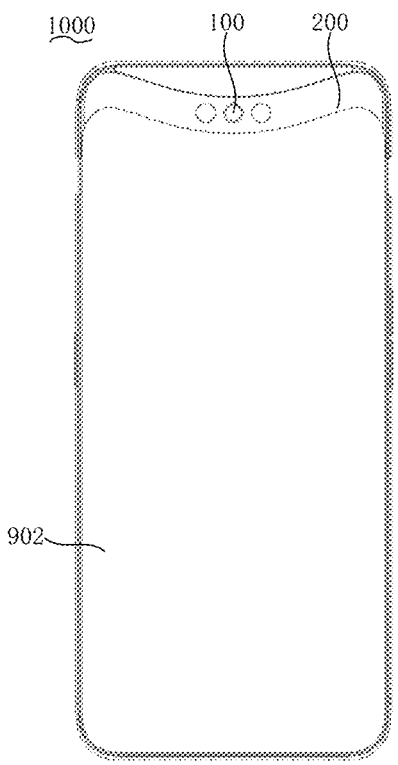
FIG. 1 illustrates a schematic plane view of an electronic device applicable to some embodiments of the present disclosure.

The embodiments of the present disclosure are further described below in connection with the accompanying drawings. The same or similar numbers in the accompanying drawings indicate from beginning to end the same or similar components or components having the same or similar functions. Furthermore, the embodiments of the present disclosure described below in connection with the accompanying drawings are exemplary and are intended only to explain the embodiments of the present disclosure and are not to be construed as limiting the present disclosure.

The embodiments of the present disclosure are further described below in connection with the accompanying drawings. The same or similar numbers in the accompanying drawings indicate from beginning to end the same or similar components or components having the same or similar functions.

Furthermore, the embodiments of the present disclosure described below in connection with the accompanying drawings are exemplary and are intended only to explain the embodiments of the present disclosure and are not to be construed as limiting the present disclosure.

In the present disclosure, unless otherwise expressly specified and limited, a first feature is "above" or "below" a second feature may be direct contact between the first and second features, or indirect contact between the first and second features through an intermediate medium. Moreover, the first feature is "above", "over" and "on" the second feature, but the first feature is directly above or diagonally above the second feature, or simply indicates that the first feature is horizontally higher above the second feature. The first feature is "under", "below", and "underneath" the second feature, but the first feature is directly below or diagonally below the second feature, or simply indicates that the first feature is less than the horizontal height of the second feature.

A zoom lens of an embodiment of the present disclosure includes: a housing, a first lens assembly arranged in the housing, a second lens assembly arranged in the housing, a third lens assembly arranged in the housing, and a first driving chip. The first lens assembly, the second lens assembly and the third lens assembly are arranged in sequential order along an optical axis of the first lens assembly. The first driving chip includes: a first control end, a second control end, a third control end and a fourth control end, the first control end is configured to control the second lens assembly to move relative to the first lens assembly along the optical axis to realize zooming of the zoom lens and the second control end is configured to control the third lens assembly to move relative to the first lens assembly along the optical axis to realize zooming of the zoom lens, the third control end is configured to control the third lens assembly to move relative to the first lens assembly along the optical axis under a first target focal length to realize focusing of the zoom lens, the fourth control end is configured to control the third lens assembly to move relative to the first lens assembly along the optical axis under a second target focal length to realize focusing of the zoom lens, and the first target focal length is different from the second target focal length.

In some embodiments, the housing includes a base plate, and the base plate includes a bearing surface; the zoom lens further includes a second driving chip and a prism assembly; the prism assembly, the first lens assembly, the second lens assembly and the third lens assembly are arranged on the bearing surface in sequential order along the optical axis; the second driving chip is configured to control the prism assembly to move in a first direction and a second direction, thereby to realize optical image stabilization; and every two of the optical axis, the first direction and the second direction are perpendicular to each other.

In some embodiments, the first direction is parallel to the bearing surface and perpendicular to the optical axis, the second direction is perpendicular to the bearing surface, and the bearing surface is parallel to the optical axis.

In some embodiments, a number of effective control bits of each of the first driving chip and the second driving chip is greater than or equal to 10, and thereby a minimum moving unit of each of the second lens assembly and the third lens assembly meets a predetermined moving accuracy.

In some embodiments, the zoom lens further includes a fourth lens assembly arranged in the housing, the second driving chip further includes a fifth control end, and the fifth control end is connected to the fourth lens assembly and configured to control the fourth lens assembly to move relative to the first lens assembly along the optical axis.

In some embodiments, the zoom lens further includes an anti-shake driving component, the second driving chip includes a first anti-shake control end and a second anti-shake control end, the first anti-shake control end and the second anti-shake control end are connected to the anti-shake driving component, the anti-shake driving component is connected to the prism assembly, the first anti-shake control end is configured to control the anti-shake driving component to move and thereby to drive the prism assembly to move in the first direction, and the second anti-shake control end is configured to control the anti-shake driving component to move and thereby to drive the prism assembly to move in the second direction.

In some embodiments, the prism assembly includes a prism, the prism includes an incident surface, a reflecting surface and an emitting surface connected in sequence, the first lens assembly is opposite to one of the incident surface and the emitting surface, and the reflecting surface is configured to reflect light incident into the incident surface to make the light exit from the emitting surface.

In some embodiments, the zoom lens further includes a first driving component and a second driving component, the first control end is connected to the second lens assembly through the first driving component, the first control end is configured to control the first driving component to move and thereby to drive the second lens assembly to move relative to the first lens assembly along the optical axis; the second control end, the third control end and the fourth control end are connected to the second driving component, the second driving component is connected to the third lens assembly, and the second control end, the third control end and the fourth control end are configured to control the second driving component to move and thereby to drive the third lens assembly to move relative to the first lens assembly along the optical axis.

In some embodiments, the first driving component includes a first coil and a first magnet, the second driving component includes a second coil and a second magnet, the first magnet is connected to the second lens assembly, the second magnet is connected to the third lens assembly, the first control end is connected to the first coil, the first control end is configured to control a current inputted to the first coil and thereby to drive the first magnet to drive the second lens assembly to move relative to the first lens assembly along the optical axis, the second control end, the third control end and the fourth control end are connected to the second coil, and the second control end, the third control end and the fourth control end are configured to control a current inputted to the second coil and thereby to drive the second magnet to drive the third lens assembly to move relative to the first lens assembly along the optical axis.

In some embodiments, the housing includes a base plate, a bearing surface of the base plate is provided with a slide rail, surfaces of the second lens assembly and the third lens assembly opposite to the bearing surface are provided with balls, and the balls of the second lens assembly and the third lens assembly are slidably connected to the slide rail and thereby the second lens assembly and the third lens assembly are movable relative to the first lens assembly along the optical axis.

In some embodiments, the third control end is further configured to control the third lens assembly to stop moving in response to a definition of an image captured by the zoom lens reaches a preset definition, under the first target focal length; the fourth control end is further configured to control the third lens assembly to stop moving in response to a definition of an image captured by the zoom lens reaches the preset definition, under the second target focal length; and the first target focal length is in a short focal state, and the second target focal length is in a long focal state.

A camera module of an embodiment of the present disclosure includes a photosensitive element and a zoom lens; the photosensitive element is arranged on an image side of the zoom lens; the zoom lens includes: a housing; a first lens assembly arranged in the housing, a second lens assembly arranged in the housing, a third lens assembly arranged in the housing, and a first driving chip. The first lens assembly, the second lens assembly and the third lens assembly are arranged in sequential order along an optical axis of the first lens assembly; the first driving chip includes: a first control end, a second control end, a third control end and a fourth control end. The first control end is configured to control the second lens assembly to move relative to the first lens assembly along the optical axis to realize zooming of the zoom lens and the second control end is configured to control the third lens assembly to move relative to the first lens assembly along the optical axis to realize zooming of the zoom lens; the third control end is configured to control the third lens assembly to move relative to the first lens assembly along the optical axis under a first target focal length to realize focusing of the zoom lens, the fourth control end is configured to control the third lens assembly to move relative to the first lens assembly along the optical axis under a second target focal length to realize focusing of the zoom lens, and the first target focal length is different from the second target focal length.

In some embodiments, the housing includes a base plate, and the base plate includes a bearing surface; the zoom lens further includes a second driving chip and a prism assembly; the prism assembly, the first lens assembly, the second lens assembly and the third lens assembly are arranged on the bearing surface in sequential order along the optical axis, the second driving chip is configured to control the prism assembly to move in a first direction and a second direction, thereby to realize optical image stabilization; and every two of the optical axis, the first direction and the second direction are perpendicular to each other.

In some embodiments, the first direction is parallel to the bearing surface and perpendicular to the optical axis, the second direction is perpendicular to the bearing surface, and the bearing surface is parallel to the optical axis.

In some embodiments, a number of effective control bits of each of the first driving chip and the second driving chip is greater than or equal to 10, and thereby a minimum moving unit of each of the second lens assembly and the third lens assembly meets a predetermined moving accuracy.

In some embodiments, the zoom lens further includes a fourth lens assembly arranged in the housing, the second driving chip further includes a fifth control end, and the fifth control end is connected to the fourth lens assembly and configured to control the fourth lens assembly to move relative to the first lens assembly along the optical axis.

In some embodiments, the zoom lens includes an anti-shake driving component, the second driving chip includes a first anti-shake control end and a second anti-shake control end, the first anti-shake control end and the second anti-shake control end are connected to the anti-shake driving component, and the anti-shake driving component is connected to the prism assembly, the first anti-shake control end is configured to control the anti-shake driving component to move and thereby to drive the prism assembly to move in the first direction, and the second anti-shake control end is configured to control the anti-shake driving component to move and thereby to drive the prism assembly to move in the second direction.

In some embodiments, the prism assembly includes a prism, the prism includes an incident surface, a reflecting surface and an emitting surface connected in sequence, the first lens assembly is opposite to one of the incident surface and the emitting surface, and the reflecting surface is configured to reflect light incident into the incident surface to make the light exit from the emitting surface.

In some embodiments, the zoom lens further includes a first driving component and a second driving component, the first control end is connected to the second lens assembly through the first driving component, and the first control end is configured to control the first driving component to move and thereby to drive the second lens assembly to move relative to the first lens assembly along the optical axis; the second control end, the third control end and the fourth control end are connected to the second driving component, the second driving component is connected to the third lens assembly, and the second control end, the third control end and the fourth control end are configured to control the second driving component to move and thereby to drive the third lens assembly to move relative to the first lens assembly along the optical axis.

In some embodiments, the first driving component includes a first coil and a first magnet, the second driving component includes a second coil and a second magnet, the first magnet is connected to the second lens assembly, the second magnet is connected to the third lens assembly, and the first control end is connected to the first coil, the first control end is configured to control a current inputted to the first coil and thereby to drive the first magnet to drive the second lens assembly to move relative to the first lens assembly along the optical axis, the second control end, the third control end and the fourth control end are connected to the second coil, and the second control end, the third control end and the fourth control end are configured to control a current inputted to the second coil and thereby to drive the second magnet to drive the third lens assembly to move relative to the first lens assembly along the optical axis.

In some embodiments, the housing includes a base plate, a bearing surface of the base plate is provided with a slide rail, surfaces of the second lens assembly and the third lens assembly opposite to the bearing surface are provided with balls, and the balls of the second lens assembly and the third lens assembly are slidably connected to the slide rail, thereby the second lens assembly and the third lens assembly are movable relative to the first lens assembly along the optical axis.

In some embodiments, the third control end is further configured to control the third lens assembly to stop moving in response to a definition of an image captured by the zoom lens reaches a preset definition, under the first target focal length; and the fourth control end is further configured to control the third lens assembly to stop moving in response to a definition of an image captured by the zoom lens reaches the preset definition, under the second target focal length; and the first target focal length is in a short focal state, and the second target focal length is in a long focal state.

An electronic device of an embodiment of the present disclosure includes: a casing; and the camera module according to any one of above embodiments, and the camera module is installed on the casing.

Figure 2:
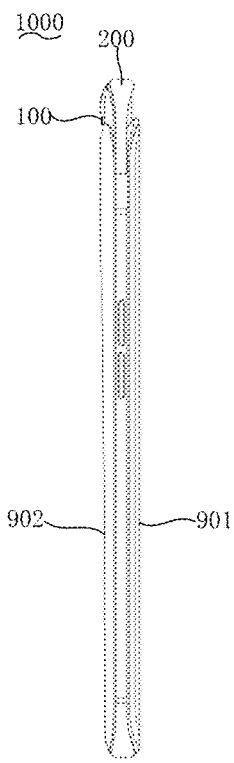
FIG. 2 illustrates a schematic plane view of an electronic device in another perspective applicable to some embodiments of the present disclosure.

Referring to FIGS. 1 and 2, an electronic device 1000 includes a casing 200 and a camera module 100. The camera module 100 is combined with the casing 200. Specifically, the electronic device 1000 may be a mobile phone, a tablet computer, a display, a notebook computer, a teller machine, a gate machine, a smart watch, a head display device, a game console, etc. The embodiments of the present disclosure takes the electronic device 1000 is the mobile phone as an example. It can be understood that the specific form of the electronic device 1000 is not limited to the mobile phone.

The casing 200 can be used to install the camera module 100, or the casing 200 can be used as an installation carrier of the camera module 100. The electronic device 1000 includes a front 901 and a back 902. The camera module 100 can be arranged on the front 901 as a front camera, and the camera module 100 can also be arranged on the back 902 as a rear camera. In the embodiments of the present disclosure, the camera module 100 is arranged on the back 902 as the rear camera. The casing 200 can further be used to install the camera module 100, a power supply device, a communication device and other functional assemblies of the electronic device 1000, therefore the casing 200 provides dust-proof, anti-falling, waterproof and other protection for the functional assemblies.

Figure 3:
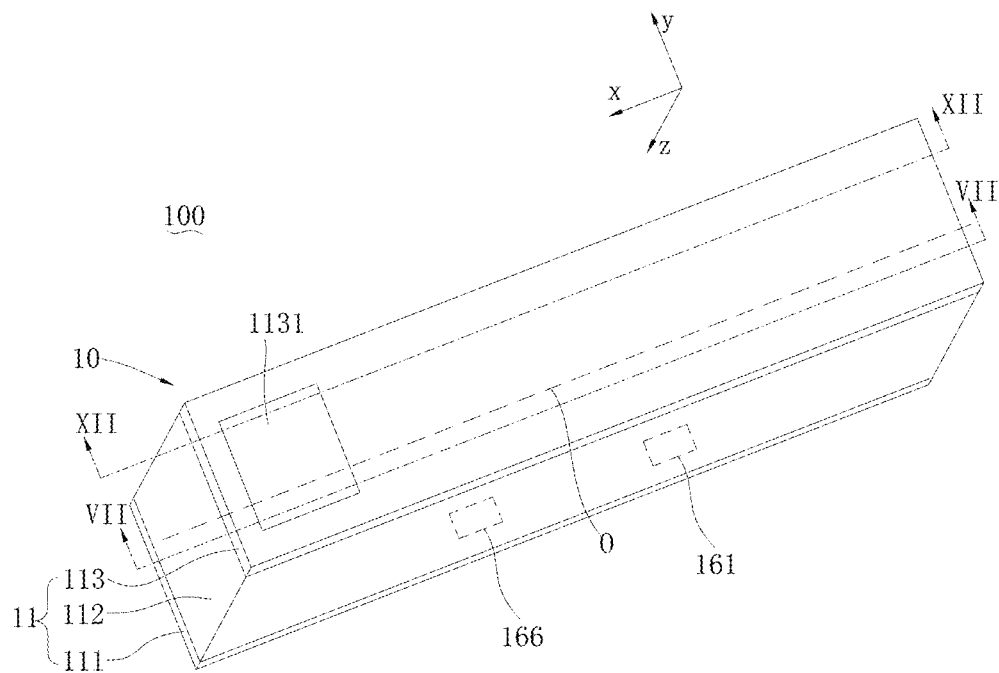
FIG. 3 illustrates a schematic three dimensional (3D) assembly view of a zoom lens applicable to some embodiments of the present disclosure.
Figure 4:
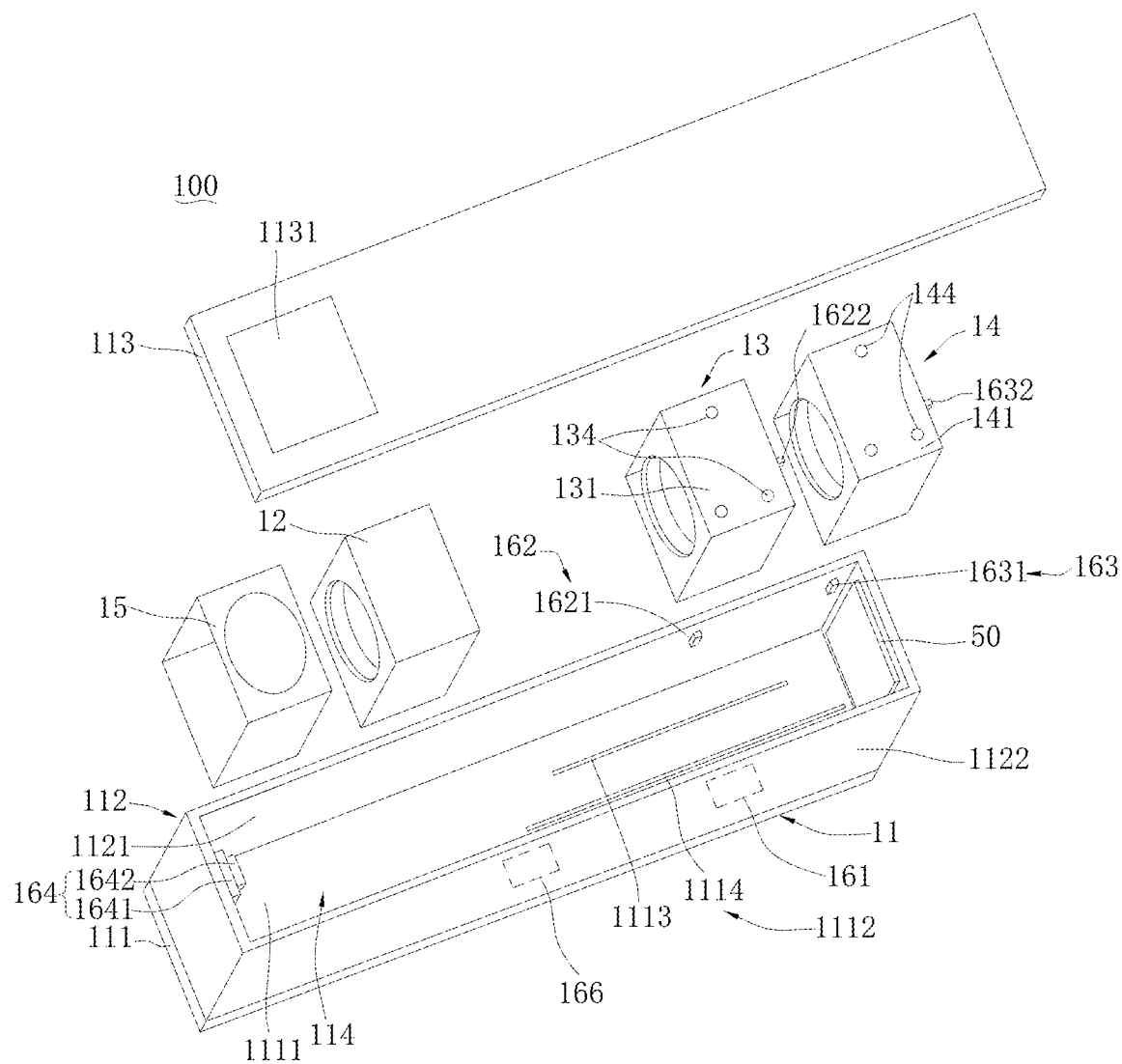
FIG. 4 illustrates a schematic 3D exploded view of a zoom lens applicable to some embodiments of the present disclosure.
Figure 5:
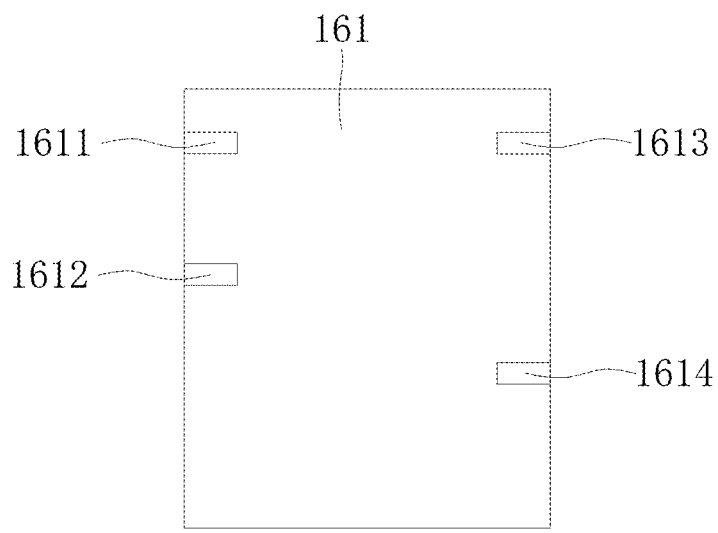
FIG. 5 illustrates a schematic plane view of a first driving chip applicable to some embodiments of the present disclosure.

Referring to FIGS. 3 to 5, the camera module 100 includes a zoom lens 10 and a photosensitive element 50, the photosensitive element 50 is mounted on an image side of the zoom lens 10. The photosensitive element 50 may adopt a complementary metal oxide semiconductor (CMOS) photosensitive element or a charge coupled device (CCD) photosensitive element.

Referring to FIGS. 3 to 6, the zoom lens 10 of the embodiment of the present disclosure includes a housing 11, a first lens assembly 12, a second lens assembly 13, a third lens assembly 14 and a first driving chip 161. The first lens assembly 12, the second lens assembly 13 and the third lens assembly 14 are arranged in the housing 11. The first lens assembly 12, the second lens assembly 13 and the third lens assembly 14 are arranged in sequential order along an optical axis O of the first lens assembly 12. The optical axis O of the first lens assembly 12, an optical axis of the second lens assembly 13 and an optical axis of the third lens assembly 14 coincide. The first driving chip 161 includes a first control end 1611, a second control end 1612, a third control end 1613 and a fourth control end 1614. The first control end 1611 is configured to control the second lens assembly 13 to move relative to the first lens assembly 12 along the optical axis O to realize zooming of the zoom lens 10 and the second control end 1612 is configured to control the third lens assembly 14 to move relative to the first lens assembly 12 along the optical axis O to realize zooming of the zoom lens 10. The third control end 1613 is configured to control the third lens assembly 14 to move relative to the first lens assembly 12 along the optical axis O under a first target focal length to realize focusing of the zoom lens 10. The fourth control end 1614 is configured to control the third lens assembly 14 to move along the optical axis O relative to the first lens assembly 12 under a second target focal length to realize focusing of the zoom lens 10. The first target focal length is different from the second target focal length. The first target focal length is greater than the second target focal length, or the first target focal length is less than the second target focal length. In the embodiment of the present disclosure, the first target focal length is less than the second target focal length.

In a zoom lens, a moving distance range of a lens group during zooming is large, and an accuracy requirements for focusing after the zooming is high. When there are few effective control bits of a driving chip, it is difficult to realize the zooming and ensure the moving accuracy of the zoom lens at the same time.

In the zoom lens 10 according to the embodiment of the present disclosure, the first driving chip 161 controls the second lens assembly 13 and the third lens assembly 14 to move relative to the first lens assembly 12 along the optical axis O through the first control end 1611 and the second control end 1612 to realize the zooming of the zoom lens 10. When the zoom lens 10 is in different focal length states (such as the first target focal length or the second target focal length), the third control end 1613 and the fourth control end 1614 each are configured to control the third lens assembly 14 to move to realize the focusing of the zoom lens 10. During the focusing, the third control end 1613 and the fourth control end 1614 only need to control the third lens group 14 to move in a small moving distance range in a corresponding current focal length state, the first driving chip 161 has fewer effective control bits and can also control the lens group (such as the second lens assembly 13 and the third lens assembly 14) to move with high precision. During the zooming, the moving distance range is relatively large, but the accuracy requirements are low. During the focusing, the moving distance range is small, but the accuracy requirements are high. Therefore, the zoom lens 10 realizes the zooming and the focusing by reasonably allocating the control ends of the driving chip, which ensures the moving accuracy of the focusing when there are few effective control bits of the driving chip.

As shown in FIG. 3, for the convenience of subsequent description, a direction parallel to the optical axis O is defined as a X direction, and two directions perpendicular to the X direction are defined as a Y direction and a Z direction respectively, that is, every two of the X direction, the Y direction and the Z direction are perpendicular to each other.

Referring to FIGS. 3, 4, 7a and 7b, a zoom lens 10 includes a housing 11, a prism assembly 15, a first lens assembly 12, a second lens assembly 13, a third lens assembly 14 and a driving assembly 16. The prism assembly 15, the first lens assembly 12, the second lens assembly 13 and the third lens assembly 14 are arranged in the housing 11 in sequential order. Both the second lens assembly 13 and the third lens assembly 14 can move relative to the first lens assembly 12 along the optical axis O under the control of the driving assembly 16.

The housing 11 includes a base plate 111, a side plate 112, and a cover plate 113. The base plate 111, the side plate 112 and the cover plate 113 surround a receiving space 114, and the prism assembly 15, the first lens assembly 12, the second lens assembly 13 and the third lens assembly 14 are arranged in the receiving space 114.

The base plate 111 includes a bearing surface 1111. The bearing surface 1111 is parallel to the optical axis O. The bearing surface 1111 is configured to support the side plate 112, the prism assembly 15, the first lens assembly 12, the second lens assembly 13 and the third lens assembly 14. The base plate 111 may be a cuboid structure, a cube structure, a cylinder structure, or a structure of other shapes, and is not limited here. In this embodiment, the base plate 111 is the cuboid structure.

A slide rail 1112 is arranged on the bearing surface 1111. An extension direction of the slide rail 1112 is parallel to the X direction. A number of the slide rail 1112 is one or more, for example, the number of the slide rail 1112 is one, two, three, four, or even more. In this embodiment, the number of the slide rail 1112 is two (the two slide rails 1112 are represented by the first slide rail 1113 and the second slide rail 1114 respectively). The extension directions of the first slide rail 1113 and the second slide rail 1114 are parallel to the X direction, and the second slide rail 1114 and the first slide rail 1113 are arranged in sequential order along the Y direction. In the X direction, a first distance between an end of the first slide rail 1113 close to the prism assembly 15 and the prism assembly 15 and a second distance between an end of the second slide rail 1114 close to the prism assembly 15 and the prism assembly 15 may be the same or different. A third distance between another end of the first slide rail 1113 facing away from the prism assembly 15 and the prism assembly 15 and a fourth distance between another end of the second slide rail 1114 facing away from the prism assembly 15 and the prism assembly 15 may be the same or different. For example, the difference between the first distance and the second distance may be that the first distance is greater than the second distance, or the first distance is less than the second distance. The difference between the third distance and the fourth distance may be that the third distance is greater than the fourth distance, or the third distance is less than the fourth distance. In this embodiment, the first distance is greater than the second distance, and the third distance is greater than the fourth distance. In this way, the movements of the second lens assembly 13 and the third lens assembly 14 are limited by the first slide rail 1113 and the second slide rail 1114.

The side plate 112 is arranged around an edge of the base plate 111. The side plate 112 is perpendicular to the bearing surface 1111 of the base plate 111. The side plate 112 can be arranged on the base plate 111 by gluing, screwing, clamping, etc. The side plate 112 may also be integrally formed with the base plate 111.

The side plate 112 includes a first side plate 1121 parallel to the X direction and a second side plate 1122 parallel to the X direction, and the first side plate 1121 is opposite to the second side plate 1122.

Referring to FIG. 3 and FIG. 4, the cover plate 113 is arranged on the side plate 112. Specifically, the cover plate 113 can be installed on an upper surface of the side plate 112 by clamping, screwing, gluing, etc.

A surface of the cover plate 113 facing away from the side plate 112 is provided with a light inlet 1131, and a depth direction of the light inlet 1131 can be perpendicular to the X direction, therefore the camera module 100 has a periscopic structure as a whole. In other embodiments, the light inlet 1131 is not a through hole, but a transparent solid structure from which light can enter the receiving space 114 and enter the prism assembly 15.

Figure 7A:
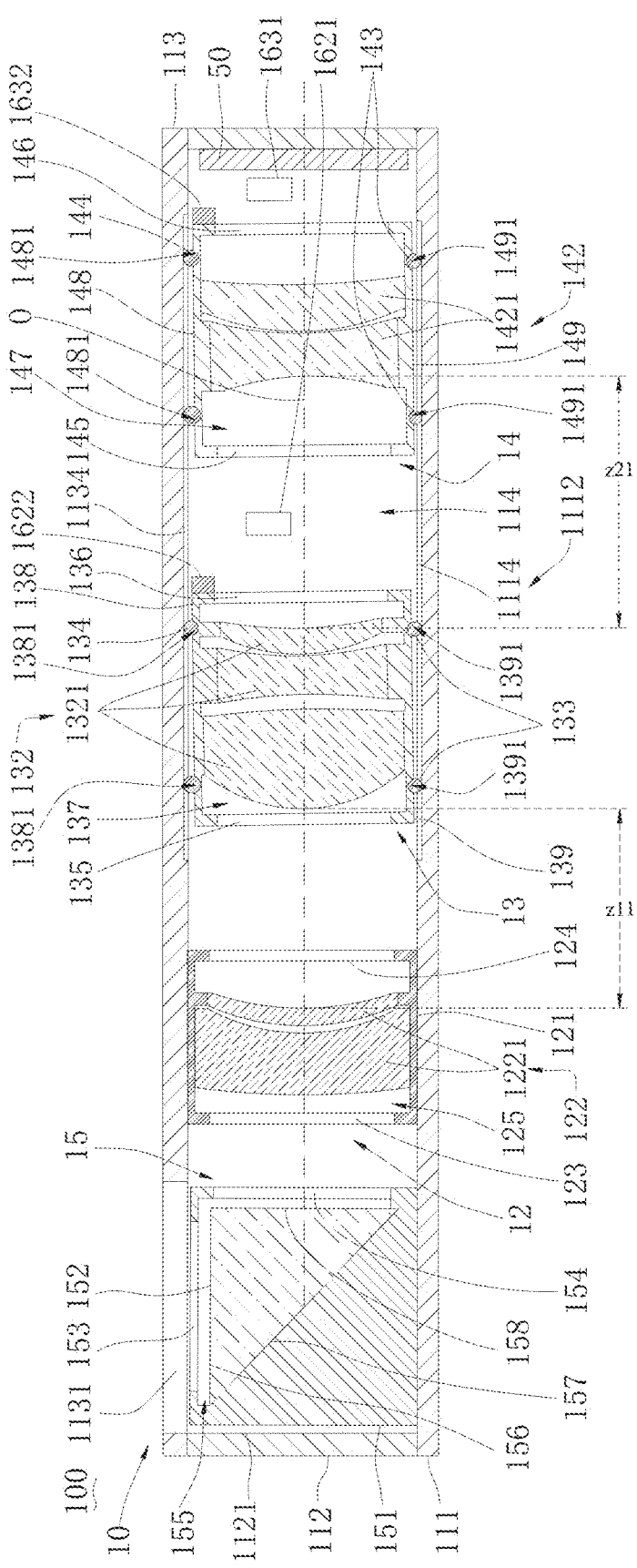
FIG. 7a and FIG. 7b illustrate schematic cross-sectional views of the zoom lens in FIG. 3 along a VI-VI line under different focus length states.
Figure 7B:
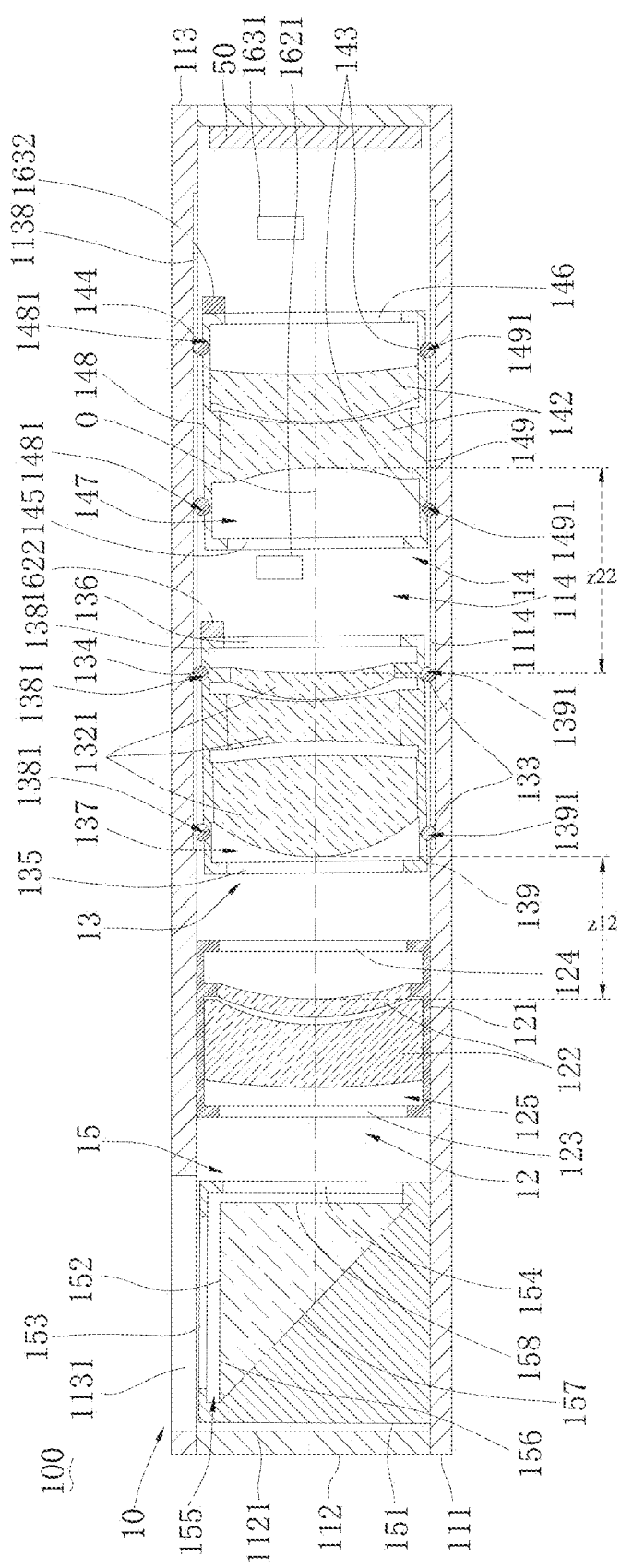

Referring to FIGS. 7a and 7b, the prism assembly 15 is arranged on the bearing surface 1111 of the base plate 111 and is located in the receiving space 114. The prism assembly 15 includes a mounting table 151 and a prism 152.

The mounting table 151 is arranged on the bearing surface 1111 of the base plate 111. Specifically, the mounting table 151 can be installed on the bearing surface 1111 by gluing, screwing, clamping, etc., and the mounting table 151 can also be integrally formed with the base plate 111. The mounting table 151 is provided with a light inlet through hole 153, a light outlet through hole 154 and a holding cavity 155. The light inlet through hole 153 and the light outlet through hole 154 communicate the holding cavity 155 with the receiving space 114. The light inlet through hole 153 is opposite to the light inlet 1131, and the light outlet through hole 154 is opposite to the first lens assembly 12.

The prism 152 is arranged in the holding cavity 155, and the prism 152 can be installed on the mounting table 151 by gluing, clamping, etc. The prism 152 includes an incident surface 156, a reflecting surface 157 and an emitting surface 158. The reflecting surface 157 obliquely connects the incident surface 156 and the emitting surface 158. An included angle between the reflecting surface 157 and the bearing surface 1111 can be 15 degrees, 30 degrees, 45 degrees, 60 degrees, 75 degrees, etc. In this embodiment, the included angle between the reflecting surface 157 and the bearing surface 1111 may be 45 degrees. The incident surface 156 is opposite to the light inlet through hole 153, and the emitting surface 158 is opposite to the light outlet through hole 154. The reflecting surface 157 is configured to reflect light incident into the incident surface 156, therefore the light exits from the emitting surface 158. The prism 152 is configured to change an exit direction of the light entered from the light inlet through hole 153. The prism 152 may be a triangular prism 152. Specifically, a cross section of the prism 152 is a right triangle, two right angle edges of the right triangle are respectively formed by the incident surface 156 and the emitting surface 158, and an inclined edge of the right triangle is formed by the reflecting surface 157.

Referring to FIGS. 4, 7a and 7b, the first lens assembly 12 includes a first housing 121 and a first lens group 122. The first lens group 122 is arranged in the first housing 121.

The first housing 121 is arranged in the receiving space 114. Specifically, the first housing 121 can be installed on the bearing surface 1111 by gluing, screwing, clamping, etc., and the first housing 121 can also be integrally formed with the base plate 111. The first housing 121 includes a light inlet hole 123, a light outlet hole 124 and a receiving cavity 125. The light inlet hole 123 and the light outlet hole 124 communicate the receiving cavity 125 with the receiving space 114. The light inlet hole 123 is opposite to the light outlet through hole 154 of the prism assembly 15, and the light outlet hole 124 is opposite to the second lens assembly 13.

The first lens group 122 is located in the receiving cavity 125, and the first lens group 122 can be installed in the first housing 121 by gluing, screwing, clamping, etc. The first lens group 122 is opposite to the emitting surface 158 of the prism 152. The first lens group 122 may have a positive focal power or a negative focal power. In this embodiment, the first lens group 122 has the negative focal power.

The first lens group 122 includes one or more first lenses 1221. For example, the first lens group 122 may include only one first lens 1221, which is a convex lens or a concave lens. In at least one alternative embodiment, the first lens group 122 includes a plurality of first lenses 1221 (such as two, three, etc.), which may be convex, concave, or partially convex and partially concave. In this embodiment, the first lens group 122 includes two first lenses 1221. The first lens 1221 may be a glass lens or a plastic lens.

Figure 8:
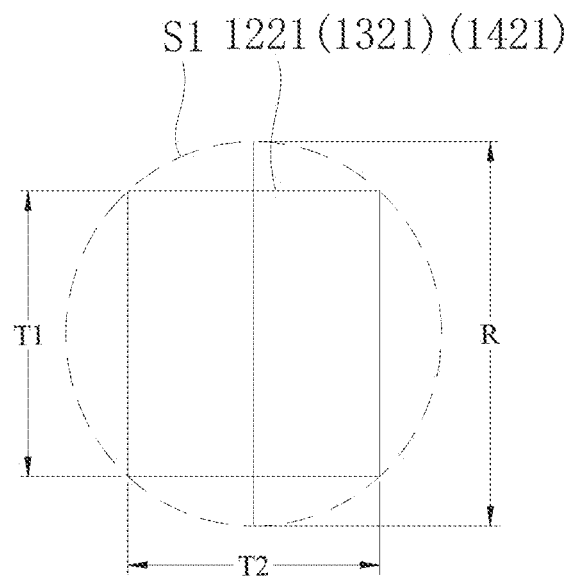
FIG. 8 illustrates a schematic plan view of a lens of a zoom lens applicable to some embodiments.

The one or more first lenses 1221 each may be a part of a rotating body, or ones of the one or more first lenses 1221 each may be the rotating body and the other ones of the one or more first lenses 1221 each may be the part of the rotating body. In this embodiment, each first lens 1221 is a part of a rotating body. For example, as shown in FIG. 8, the first lens 1221 first forms a rotating body lens S1 through a mold. A shape of the rotating body lens S1 cut by a plane perpendicular to the optical axis O is a circle with a diameter of R, and then an edge of the rotating body lens S1 is cut to form the first lens 1221. A shape of the first lens 1221 cut by the plane perpendicular to the optical axis O is a rectangle. Two edges of the rectangle are T1 and T2, T1/R∈[0.5,1), T2/R∈[0.5,1). For example, T1/R may be 0.5, 0.6, 0.7, 0.75, 0.8, 0.95, etc., and T2/R may be 0.55, 0.65, 0.7, 0.75, 0.85, 0.9, etc. It can be understood that the specific ratios of T1/R and T2/R are determined according to factors such as a size of an internal space of the electronic device 1000 and optical parameters (such as a size of an effective optical area of the first lens 1221) of the zoom lens 10. In at least one alternative embodiment, the lenses in the first lens group 122 are made directly using a special mold, and a mold cavity of the mold is a part of a rotating body that has determined the specific ratios of T1/R and T2/R, thereby to directly make the first lens 1221. In this way, the first lens 1221 is the part of the rotating body lens S1, compared with the complete rotating body lens S1, the volume is smaller, which reduces the overall volume of the zoom lens 10 and is conducive to the miniaturization of the electronic device 1000.

Referring to FIGS. 4, 7a and 7b, the second lens assembly 13 includes a second housing 131, a second lens group 132 and a first ball 133. The second lens group 132 is mounted in the second housing 131. When the second housing 131 slides, the second housing 131 drives the second lens group 132 to slide.

The second housing 131 is provided with a first light inlet 135 and a first light outlet 136 corresponding to the second lens group 132. The second housing 131 is formed with a first holding space 137 to hold the second lens group 132, and the first holding space 137 is communicated with the receiving space 114 through the first light inlet 135 and the first light outlet 136. The first light inlet 135 is opposite to the light outlet hole 124 of the first lens assembly 12, and the first light outlet 136 is opposite to the third lens assembly 14.

The second housing 131 further includes a first top surface 138 and a first bottom surface 139 (i.e., a surface of the second housing 131 opposite the bearing surface 1111) opposite to each other. The first top surface 138 is opposite to the cover plate 113. The first bottom surface 139 is opposite to the bearing surface 1111 of the base plate 111. The first bottom surface 139 is provided with a first groove 1391, the first ball 133 is arranged in the first groove 1391 and in contact with a bottom of the slide rail 1112, and the first ball 133 is slidably connected to the slide rail 1112.

Specifically, the first groove 1391 matches a shape of the first ball 133. For example, the first ball 133 is spherical and has low moving resistance, the first groove 1391 is a semicircular groove, and a diameter of the first ball 133 is equal to that of the first groove 1391, that is, a half of the first ball 133 is located in the first groove 1391. The first ball 133 and the first groove 1391 are closely combined. When the first ball 133 moves, it can drive the second housing 131 of the second lens assembly 13 to move. The slide rail 1112 may be a groove formed on the bearing surface 1111 with an extension direction parallel to the X direction, and the slide rail 1112 may also be a bump arranged on the bearing surface 1111 with an extension direction parallel to the X direction. The surface of the bump opposite to the bottom surface of the second housing 131 forms a groove matched with the first ball 133. In this embodiment, the slide rail 1112 is a groove formed on the bearing surface 1111 with an extension direction parallel to the X direction. After the second lens assembly 13 is installed in the receiving space 114, a part of the first ball 133 is located in the slide rail 1112 and in contact with the bottom of the slide rail 1112. A shape of an inner wall of the slide rail 1112 cut by the plane perpendicular to the X direction is a first arc, an outer contour of the first ball 133 cut by the plane perpendicular to the X direction is a second arc, and a curvature of the first arc is the same as that of the second arc. Thus, in the Y direction, the outer wall of the first ball 133 is closely combined with the inner wall of the slide rail 1112, and the opposite sides of the outer wall of the first ball 133 are in contact with the opposite sides of the inner wall of the slide rail 1112.

A number of the first groove 1391 is one or more. For example, the number of the first groove 1391 is one, two, three, four, or even more. In this embodiment, the number of the first groove 1391 is three. A number of the first ball 133 may also be one or more. In this embodiment, the number of the first ball 133 is the same as the number of the first groove 1391, and there are also three. The three first grooves 1391 are spaced on the first bottom surface 139.

A number of the slide rail 1112 can be determined according to positions of the three first grooves 1391. For example, a connecting line of the three first grooves 1391 is parallel to the optical axis O, only one slide rail 1112 needs to be set. For another example, the three first grooves 1391 are divided into two groups (hereinafter referred to as a first group and a second group). The first group includes one first groove 1391, the second group includes two first grooves 1391, and the first groove 1391 of the first group is not on the connecting line of the two first grooves 1391 of the second group (that is, the three first grooves 1391 can be surrounded into a triangle), and two slide rails 1112 are required to correspond to the first group and the second group respectively. In this embodiment, the three first grooves 1391 are divided into the first group and the second group. The first group includes the one first groove 1391, and the second group includes the two first grooves 1391. The first group corresponds to the first slide rail 1113, and the second group corresponds to the second slide rail 1114. In this way, the first ball 133 corresponding to the first group slides in the first slide rail 1113, the first balls 133 corresponding to the second group slide in the second slide rail 1113, the first ball 133 corresponding to the first group and the first balls 133 corresponding to the second group are limited in the first slide rail 1113 and the second slide rail 1114 respectively, and the three first balls 133 form a triangle (a center of the first ball 133 in the first slide rail 1113 is an apex of the triangle), on the premise of ensuring the sliding stability, the number of the first ball 133 can be reduced as much as possible to reduce the sliding resistance. Moreover, in the Y direction, opposite sides of an outer wall of the first ball 133 corresponding to the first group are in contact with opposite sides of an inner wall of the first slide rail 1113, and opposite sides of an outer wall of each first ball 133 corresponding to the second group are in contact with opposite sides of an inner wall of the second slide rail 1114, the three first balls 133 form the triangle, which can prevent the second lens assembly 13 from shaking or tilting in the Y direction, therefore, the imaging quality of the camera module 100 is not affected. In addition, since the first distance is greater than the second distance, when the second lens assembly 13 slides in the X direction (that is, when sliding to the first lens assembly 12), the first ball 133 corresponding to the first group is in contact with an end of the first slide rail 1114 close to the prism assembly 15 to restrict the second lens assembly 13 from sliding to the first lens assembly 12 and thereby to limit the moving distance of the second lens assembly 13.

The second lens group 132 is arranged in the first holding space 137. Specifically, the second lens group 132 can be installed in the first holding space 137 by gluing, screwing, clamping, etc. The second lens group 132 may have a positive focal power or a negative focal power. In this embodiment, the second lens group 132 has the positive focal power.

The second lens group 132 includes one or more second lenses 1321. The second lens group 132 may include only one second lens 1321, which is a convex lens or a concave lens. In at least one alternative embodiment, the second lens group 132 includes a plurality of second lenses 1321 (such as two, three, etc.), which may be convex, concave, or partially convex and partially concave. In this embodiment, the second lens group 132 includes three second lenses 1321. The second lens 1321 may be a glass lens or a plastic lens.

Referring to FIG. 8, the one or more second lenses 1321 each may be a part of a rotating body, or ones of the one or more second lenses 1321 each may be the rotating body and the other ones of the one or more second lenses 1321 each may be the part of the rotating body. In this embodiment, each second lens 1321 is the part of the rotating body. For example, the second lens 1321 first forms a rotating body lens S1 through a mold. A shape of the rotating body lens S1 cut by a plane perpendicular to the optical axis O is a circle with a diameter of R, and then an edge of the rotating body lens S1 is cut to form the second lens 1321. A shape of the second lens 1321 cut by the plane perpendicular to the optical axis O is a rectangle. Two sides of the rectangle are T1 and T2, T1/R∈[0.5,1), T2/R∈[0.5,1). For example, T1/R may be 0.5, 0.6, 0.7, 0.75, 0.8, 0.95, etc., and T2/R may be 0.55, 0.65, 0.7, 0.75, 0.85, 0.9, etc. It can be understood that the specific ratios of T1/R and T2/R is determined according to a size of an internal space of the electronic device 1000, optical parameters (such as a size of an effective optical area of the second lens 1321) of the zoom lens 10 and other factors. In at least one alternative embodiment, the second lens 1321 is made directly using a special mold, and a mold cavity of the mold is the part of the rotating body that has determined the specific ratios of T1/R and T2/R, and thereby to directly make the second lens 1321. Thus, the second lens 1321 is the part of the rotating body lens S1 and has a smaller volume than the complete rotating body lens S1, which reduces the overall volume of the zoom lens 10 and is conducive to the miniaturization of the electronic device 1000. It should be noted that FIG. 8 is only used to illustrate the first lens 1221 and the second lens 1321, not to represent a size of the second lens 1321, and it should not be understood that the size of the second lens 1321 is the same as that of the first lens 1221.

Referring to FIGS. 4, 7a and 7b, the third lens assembly 14 includes a third housing 141, a third lens group 142 and a third ball 143. The third lens group 142 is mounted in the third housing 141. When the third housing 141 slides, the third housing 141 drives the third lens group 142 to slide.

The third housing 141 is provided with a second light inlet 145 and a second light outlet 146 corresponding to the third lens group 142. The third housing 141 is formed with a second holding space 147 to hold the third lens group 142, and the second holding space 147 is communicated with the receiving space 114 through the second light inlet 145 and the second light outlet 146. The second light inlet 145 is opposite to the first light outlet 136 of the second lens assembly 13, and the second light outlet 146 is opposite to the photosensitive element 50 (the photosensitive element 50 is arranged on an inner surface of the side plate 112 opposite to the second light outlet 146).

The third housing 141 includes a second top surface 148 and a second bottom surface 149 (a surface of the third housing 141 opposite to the bearing surface 1111). The second top surface 148 is opposite to the cover plate 113. The second bottom surface 149 is opposite to the bearing surface 1111 of the base plate 111. The second bottom surface 149 is provided with a third groove 1491, the third ball 143 is arranged in the third groove 1491 and in contact with the bottom of the slide rail 1112, and the third ball 143 is slidably connected to the slide rail 1112.

Specifically, the third groove 1491 matches a shape of the third ball 143. For example, the third ball 143 is spherical and has low moving resistance, the third groove 1491 is a semicircular groove, and a diameter of the third ball 143 is equal to that of the third groove 1491, that is, a half of the third ball 143 is located in the third groove 1491. The third ball 143 and the third groove 1491 are closely combined. When the third ball 143 moves, it can drive the third housing 141 of the third lens assembly 14 to move. After the third lens assembly 14 is installed in the receiving space 114, the part of the third ball 143 is located in the slide rail 1112 and in contact with the bottom of the slide rail 1112. A shape of an inner wall of the slide rail 1112 cut by a plane perpendicular to the X direction is a first arc, an outer contour of the third ball 143 cut by the plane perpendicular to the X direction is a second arc, and a curvature of the first arc is the same as that of the second arc. Thus, in the Y direction, the outer wall of the third ball 143 is closely combined with the inner wall of the slide rail 1112, and the opposite sides of the outer wall of the third ball 143 are in contact with the opposite sides of the inner wall of the slide rail 1112.

A number of the third groove 1491 is one or more. For example, the number of the third groove 1491 is one, two, three, four, or even more. In this embodiment, the number of the third groove 1491 is three. A number of the third ball 143 may also be one or more. In this embodiment, the number of the third ball 143 is the same as the number of the third groove 1491, and there are also three. The three third grooves 1491 are spaced on the second bottom surface 149.

In this embodiment, the three third grooves 1491 are divided into a third group and a fourth group. The third group includes one third groove 1491, the fourth group includes two third grooves 1491, the third group corresponds to the first slide rail 1113, and the fourth group corresponds to the second slide rail 1114. In this way, the third ball 143 corresponding to the third groove 1491 of the third group slides in the first slide rail 1113, the third balls 143 corresponding to the third grooves 1491 of the fourth group slide in the second slide rail 1113, the third ball 143 corresponding to the third group and the third balls 143 corresponding to the fourth group are limited in the first slide rail 1113 and the second slide rail 1114 respectively, and the three third balls 143 form a triangle. On the premise of ensuring the sliding stability, reducing the number of the third ball 143 as much as possible can reduce the sliding resistance. Moreover, in the Y direction, opposite sides of an outer wall of the third ball 143 corresponding to the third group are in contact with the opposite sides of the inner wall of the first slide rail 1113, and opposite sides of the outer wall of each third ball 143 corresponding to the fourth group are in contact with the opposite sides of the inner wall of the second slide rail 1114, and the three third balls 143 form a triangle, which can prevent the third lens assembly 14 from shaking or tilting in the Y direction, Thus, the imaging quality of the camera module 100 is not affected. In addition, when the third lens assembly 14 slides in a opposite direction of the X direction (that is, when sliding to the photosensitive element 50), the third ball 143 corresponding to the third group will first contact the end of the first slide rail 1113 close to the photosensitive element 50, thereby to restrict the third lens assembly 14 from sliding in the opposite direction of the X direction. The first slide rail 1113 can limit the moving distance of the third lens assembly 14. The third ball 143 corresponding to the third group is in contact with the end of the first slide rail 1114 facing away from the prism assembly 15 to limit the continuous sliding of the third lens assembly 14 to the photosensitive element 50, and thereby to limit the moving distance of the third lens assembly 14. Compared with the first distance equal to the second distance and the third distance equal to the fourth distance, when the first distance is greater than the second distance and the third distance is greater than the fourth distance, a length of the first slide rail 1113 is smaller.

The third lens group 142 is arranged in the second holding space 147. Specifically, the third lens group 142 can be installed in the second holding space 147 by gluing, screwing, clamping, etc. The third lens group 142 may have a positive or negative focal power. In this embodiment, the third lens group 142 has the negative focal power.

The third lens group 142 includes one or more third lenses 1421. The third lens group 142 includes only one third lens 1421, which is a convex lens or a concave lens. In at least one alternative embodiment, the third lens group 142 includes a plurality of third lenses 1421 (such as two, three, etc.), which may be convex, concave, or partially convex and partially concave. In this embodiment, the third lens group 142 includes two third lenses 1421. The third lens 1421 may be a glass lens or a plastic lens.

Referring again to FIG. 8, the one or more third lenses 1421 each may be a part of a rotating body, or ones of the one or more third lenses 1421 each may be the rotating body and the other ones of the one or more third lenses 1421 each may be the part of the rotating body. In this embodiment, each third lens 1421 is the part of the rotating body. For example, the third lens 1421 first forms a rotating body lens S1 through a mold. A shape of the rotating body lens S1 cut by the plane perpendicular to the optical axis O is a circle with a diameter of R, and then an edge of the rotating body lens S1 is cut to form the third lens 1421. A shape of the third lens 1421 cut by the plane perpendicular to the optical axis O is a rectangle. Two sides of the rectangle are T1 and T2, $T1/R \in [0.5,1)$, $T2/R \in [0.5,1)$. For example, T1/R may be 0.5, 0.6, 0.7, 0.75, 0.8, 0.95, etc., and T2/R may be 0.55, 0.65, 0.7, 0.75, 0.85, 0.9, etc. It can be understood that the specific ratios of T1/R and T2/R are determined according to a size of an internal space of the electronic device 1000, optical parameters (such as a size of an effective optical area of the third lens 1421) of the zoom lens 10 and other factors. In at least one alternative embodiment, the third lens 1421 is made directly using a special mold, and the mold cavity of the mold is a part of the rotating body that has determined the specific ratios of T1/R and T2/R, and thereby to directly make the third lens 1421. Thus, the third lens 1421 is the part of the rotating body lens S1 and has a smaller volume than the complete rotating body lens S1, which reduces the overall volume of the zoom lens 10 and is conducive to the miniaturization of the electronic device 1000. It should be noted that FIG. 8 is only used to illustrate the first lens 1221, the second lens 1321 and the third lens 1421, and is not used to represent the size of the third lens 1421, nor should it be understood that the size of the third lens 1421, the size of the second lens 1321 and the size of the first lens 1221 are the same.

Referring to FIGS. 4, 7a and 7b, the driving assembly 16 includes a first driving component 162, a second driving component 163, an anti-shake driving component 164, a first driving chip 161 and a second driving chip 166. The first driving chip 161 is connected to the first driving component 162 and the second driving component 163, and the second driving chip 166 is connected to the anti-shake driving component 164.

The first driving component 162 includes a first coil 1621 and a first magnet 1622.

A number of the first coil 1621 is one or more. For example, the number of the first coil 1621 is one, two, three, four, or even more. In this embodiment, the number of the first coil 1621 is one. The first coil 1621 is arranged on the first side plate 1121 or the second side plate 1122. In this embodiment, the first coil 1621 is arranged on an inner surface of the first side plate 1121, and the first coil 1621 can be installed on the first side plate 1121 by gluing, screwing, clamping, etc. In other embodiments, there are two first coils 1621, and the two first coils 1621 are respectively arranged on the first side plate 1121 and the second side plate 1122. The first coil 1621 may be arranged at any position of the first side plate 1121. For example, the first coil 1621 may be arranged on the inner surface (i.e., the surface located in the receiving space 114) of the first side plate 1121 and between the second lens group 132 and the third lens group 142. In at least one alternative embodiment, the first coil 1621 may be arranged on the inner side of the first side plate 1121 and between the first lens assembly 12 and the second lens assembly 13, and so on, which will not be repeated here. In this embodiment, the first coil 1621 may be arranged on the inner side of the first side plate 1121 and between the second lens group 132 and the third lens group 142. In other embodiments, the first coil 1621 may be disposed on the first housing 121 and opposite to the first magnet 1622.

The first magnet 1622 is connected to the second lens group 132. Specifically, the first magnet 1622 is arranged on the second housing 131, and the first magnet 1622 can be arranged at any position of the second housing 131. For example, the first magnet 1622 is arranged on the surface of the second housing 131 opposite to the third housing 141, or the first magnet 1622 is arranged on the surface of the second housing 131 opposite to the first lens assembly 12, etc. In this embodiment, the first magnet 1622 is arranged on the surface of the second housing 131 opposite to the third housing 141. The first magnet 1622 may be mounted on the second housing 131 by gluing, screwing, clamping, etc. The first magnet 1622 may be a metal having magnetism. For example, the first magnet 1622 may be any one of iron, cobalt and nickel, or the first magnet 1622 may be an alloy composed of at least two of iron, cobalt and nickel.

The second driving component 163 includes a second coil 1631 and a second magnet 1632.

A number of the second coil 1631 is one or more. For example, the number of the second coil 1631 is one, two, three, four, or even more. In this embodiment, the number of the second coil 1631 is one. The second coil 1631 is arranged on the first side plate 1121 or the second side plate 1122. In this embodiment, the second coil 1631 is arranged on the first side plate 1121, and the second coil 1631 can be installed on the first side plate 1121 by gluing, screwing, clamping, etc. In other embodiments, the number of the second coil 1631 are two, and the two second coils 1631 are respectively arranged on the first side plate 1121 and the second side plate 1122. The second coil 1631 may be arranged at any position of the side plate 112. For example, the second coil 1631 may be arranged on the inner side of the first side plate 1121 and located between the second lens group 132 and the third lens group 142. In at least one alternative embodiment, the second coil 1631 may be arranged on the inner side of the first side plate 1121 and on the side of the third lens group 142 opposite to the second lens group 132. In at least one alternative embodiment, the second coil 1631 may be arranged on the inner surface (that is, the second coil 1631 is located on the side of the third lens group 142 opposite to the second lens group 132 and opposite to the second magnet 1632) of the side plate 112 opposite to the third lens group 142, and so on, which will not be repeated here. In this embodiment, the second coil 1631 is arranged on the inner side of the first side plate 1121 and is located on the side of the third lens group 142 opposite to the second lens group 132.

The second magnet 1632 is connected to the third lens group 142. Specifically, the second magnet 1632 is arranged on the third housing, and the second magnet 1632 can be arranged at any position of the third housing 141. For example, the second magnet 1632 is arranged on the surface of the third housing 141 opposite to the second housing 131, or the second magnet 1632 is arranged on the surface of the third housing 141 opposite to the photosensitive element 50, etc. In this embodiment, the second magnet 1632 is arranged on the surface of the third housing 141 opposite to the photosensitive element 50, and the second magnet 1632 can be installed on the second housing 131 by gluing, screwing, clamping, etc. The second magnet 1632 may be a metal having magnetism. For example, the second magnet 1632 may be any one of iron, cobalt and nickel, or the second magnet 1632 may be an alloy composed of at least two of iron, cobalt and nickel.

In other embodiments, the first coil 1621 is arranged at any position of the second housing 131. For example, the first coil 1621 is arranged on the surface of the second housing 131 opposite to the third housing 141, or the first coil 1621 is arranged on the surface of the second housing 131 opposite to the first lens assembly 12, etc. The first magnet 1622 is arranged on the first side plate 1121 or the second side plate 1122. For example, the first magnet 1622 is arranged on the first side plate 1121, specifically, the first magnet 1622 is arranged on the inner side of the first side plate 1121 and is located between the second lens group 132 and the third lens group 142.

The second coil 1631 is arranged at any position of the third housing 141. For example, the second coil 1631 is arranged on the surface of the third housing 141 opposite to the second housing 131, or the second coil 1631 is arranged on the surface of the third housing 141 opposite to the photosensitive element 50, etc. The second magnet 1632 is arranged on the first side plate 1121 or the second side plate 1122. For example, the second magnet 1632 is arranged on the first side plate 1121, specifically, the second magnet 1632 is arranged on the inner side of the first side plate 1121 and is located on the side of the third lens group 142 opposite to the second lens group 132.

Referring to FIG. 3, FIG. 4, FIG. 7a and FIG. 7b, in some embodiments, the first driving component 162 and the second driving component 163 can also include linear motors. A stator of the first linear motor of the first driving component 162 can be fixedly installed on the inner surface of the side plate 112, a mover of the first linear motor extends from the stator and is connected to the second housing 131, and a stator of the second linear motor of the second driving component 163 is also fixedly installed on the inner surface of the side plate 112, a mover of the second linear motor extends from the stator and is connected to the third housing 141. When the mover of the first linear motor makes a linear telescopic movement, it drives the second housing 131 to move linearly along the optical axis O. when the mover of the second linear motor makes a linear telescopic movement, it drives the third housing 141 to move linearly along the optical axis O. Of course, the first driving component 162 and the second driving component 163 can also be other structures, such as hydraulic structure, piezoelectric motor, etc., which will not be listed one by one here.

Referring to FIGS. 3, 4, 7a and 7b, the anti-shake driving component 164 includes a motor 1641 and a connecting frame 1642. An end of the connecting frame 1642 is connected to the motor 1641, and another end is connected to the housing 11. The connecting frame 1642 is fixedly connected to the mounting table 151 of the prism assembly 15, and the mounting table 151 is in contact with the bearing surface 1111.

The motor 1641 may be a stepping motor. The motor 1641 is configured to drive the connecting frame 1642 to move in the first direction to drive the prism assembly 15 to move in the first direction, and the motor is further configured to drive the connecting frame 1642 to move in the second direction to drive the prism assembly 15 to move in the second direction.

Figure 6:
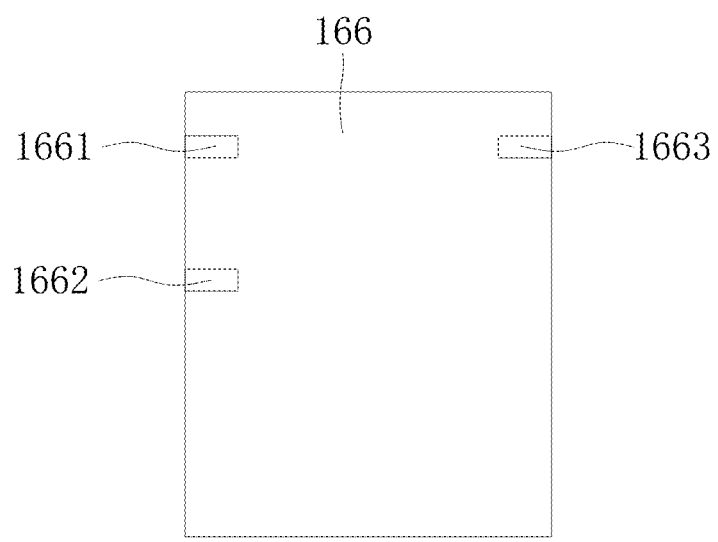
FIG. 6 illustrates a schematic plane view of a second driving chip applicable to some embodiments of the present disclosure.

Referring to FIGS. 5 and 6, the first driving chip 161 includes a first control end 1611, a second control end 1612, a third control end 1613 and a fourth control end 1614. The first driving chip 161 is connected to both the first driving component 162 and the second driving component 163. The first control end 1611 is connected to the second lens assembly through the first driving component 161. Specifically, the first control end 1611 is connected to the first coil 1621. The second control end 1612, the third control end 1613 and the fourth control end 1614 are connected to the second coil 1631. The first driving chip 161 is arranged on the base plate 111. For example, the base plate 111 itself is a circuit board, and the first driving chip 161 is a part of the circuit board. Wiring can be carried out in the housing 11 to realize the connection of the first driving chip 161, the first coil 1621 and the second coil 1631. The first driving chip 161 realizes the connection with the second lens assembly 13 and the third lens assembly 14 through a magnetic connection between the first coil 1621 and the first magnet 1622 and a magnetic connection between the second coil 1631 and the second magnet 1632.

The first driving chip 161 includes a plurality of pins. A number of effective control bits of the first driving chip 161 is greater than or equal to 10, thereby a minimum moving unit of each of the second lens assembly 13 and the third lens assembly 14 meets a predetermined moving accuracy, the minimum moving unit is a minimum distance that the first driving chip 161 can control each moving of the second lens assembly 13 and/or the third lens assembly 14, and a minimum moving unit corresponding to the predetermined moving accuracy may be 0.5 μm, 1 μm, 2 μm, etc. In this embodiment, the minimum moving unit corresponding to the predetermined moving accuracy is 0.5 μm. For example, the number of the effective control bits of the first driving chip 161 may be 10, 11, 12, 13, 14, 15, 16, etc. The number of the effective control bits is a number of pins (hereinafter referred to as first control pin) in all pins of the first driving chip 161 that can be used to control the moving of the lens assembly (such as the second lens assembly 13 and/or the third lens assembly 14). For example, the number of pins in the first driving chip 161 that can be used to control the moving of the lens assembly is 10 (i.e., the number of first control pins is 10), the number of the effective control bits of the first driving chip 161 is 10.

The first driving chip 161 controls signal outputs of the first control end 1611, the second control end 1612, the third control end 1613 and the fourth control end 1614 through 10 number of first control pins. For example, the first driving chip 161 can output current signals, voltage signals, etc. to the first control end 1611, the second control end 1612, the third control end 1613 and the fourth control end 1614. In this embodiment, the first driving chip 161 can output current signals to the first control end 1611, the second control end 1612, the third control end 1613 and the fourth control end 1614.

The second driving chip 166 is configured to control the movement of the zoom lens 10 in the first direction and the second direction to achieve the optical image stabilization, and the first direction is perpendicular to the second direction. The first direction is parallel to the bearing surface 1111 and perpendicular to the optical axis O (that is, the first direction is a direction parallel to the Y direction of the zoom lens 10), and the second direction is perpendicular to the bearing surface 1111 (that is, the second direction is a direction parallel to the Z direction of the zoom lens 10), that is, every two of the optical axis O, the first direction and the second direction are perpendicular to each other. In this way, the zoom lens 10 can change the deviation of the optical path caused by user shake by controlling the prism assembly 15 to move in the first and second directions perpendicular to the optical path O, thereby to offset the influence of the user shake on capturing and realize the optical image stabilization. The zoom lens 10 realizes the optical image stabilization of the zoom lens alone through the second driving chip 166. Since the overall moving distance range of the zoom lens 10 is also small during the optical image stabilization, the second driving chip 166 can control the movement of the zoom lens with high precision even if there are few effective control bits, and thereby to realize the optical image stabilization.

The second driving chip 166 includes a first anti-shake control end 1661 and a second anti-shake control end 1662. The first anti-shake control end 1661 and the second anti-shake control end 1662 are connected to the anti-shake driving component 164. The second driving chip 166 can also be arranged on the base plate 111 and connected to the motor 1641 by wiring on the side plate 112. In other embodiments, the second driving chip 166 may be directly arranged on the motor 1641.

Specifically, the first anti-shake control end 1661 and the second anti-shake control end 1662 are connected to the motor 1641. The first anti-shake control end 1661 controls the zoom lens 10 to move in the first direction by controlling the motor 1641, and the second anti-shake control end 1662 controls the zoom lens 10 to move in the second direction by controlling the motor 1641, and thereby to compensate the shake of the zoom lens 10 and realize the optical image stabilization.

The second driving chip 166 includes a plurality of pins. A number of effective control bits of the second driving chip 166 is greater than or equal to 10. For example, the number of the effective control bits of the second driving chip 166 may be 10, 11, 12, 13, 14, 15, 16, etc. The number of effective control bits is a number of pins (hereinafter referred to as the second control pin) in all pins of the second driving chip 166 that can be used to control the overall movement of the zoom lens 10. For example, the number of pins in the second driving chip 166 that can be used to control the overall movement of the zoom lens 10 is 10 (that is, the number of second control pins is 10), the number of the effective control bits of the second driving chip 166 is 10.

The second driving chip 166 controls signal outputs of the first anti-shake control end 1661 and the second anti-shake control end 1662 through 10 number of second control pins. For example, the second driving chip 166 can output current signals, voltage signals, etc. to the first anti-shake control end 1661 and the second anti-shake control end 1662. In this embodiment, the second driving chip 166 can output current signals to the first anti-shake control end 1661 and the second anti-shake control end 1662.

In an embodiment of the present disclosure, during the zooming, an accuracy required by the zoom lens 10 is low, for example, 2 μm, the first control end 1611 and the second control end 1612 control the second lens assembly 13 and the third lens assembly 14 to move at least 2 μm, each time different current signals are output. The first driving chip 161 can output $2^{10}$ number of different current signals through 10 number of first control pins, that is, the first control end 1611 and the second control end 1612 each can output $2^{10}$ number of different current signals, the maximum moving distance ranges of the second lens assembly 13 and the third lens assembly 14 during the zooming each is $2^{10}*2=4096$ μm. That is, the maximum distances between the starting point and the end point of the moving distance of the respective second lens assembly 13 and the third lens assembly 14 may be 4096 µm.

In an embodiment of the present disclosure, during the focusing and performing optical image stabilization, the moving accuracy of the zoom lens 10 during the focusing and performing optical image stabilization needs to be less than or equal to 0.5 µm to ensure the accuracy of the zoom lens 10 in the focusing and performing optical image stabilization, and adjust the errors caused by the low zoom accuracy. For example, the moving accuracy of the zoom lens 10 during focusing is equal to 0.5 µm. It indicates that when the third control end 1613 and the fourth control end 1614 output different current signals each time, the third lens assembly 14 needs to move at least 0.5 µm. When the first anti-shake control end 1661 and the second anti-shake control end 1162 output different current signals each time, the zoom lens 10 as a whole should move at least 0.5 µm. The first driving chip 161 can output $2^{10}$ number of different current signals through 10 number of first control pins, that is, the third control end 1613 and the fourth control end 1614 each can output $2^{10}$ number of different current signals, therefore the maximum moving distance range of the third lens assembly 14 during focusing is $2^{10}*0.5=512$ µm. That is, the maximum distances between the starting point and the end point of the moving distance of the second lens assembly 13 and the third lens assembly 14 may be 512 µm. The second driving chip 166 can also output $2^{10}$ number of different current signals through 10 number of second control pins, that is, the first anti-shake control end 1661 and the second anti-shake control end 1662 can output $2^{10}$ number of different current signals, therefore the maximum travel range of the zoom lens 10 is $2^{10}*0.5=512$ µm. That is, the maximum distance between the starting point and the end point of the moving distance of the zoom lens 10 in the first direction or the second direction can be 512 µm.

Referring to FIG. 5, FIG. 7a and FIG. 7b, when a user captures images with the electronic device 1000, the user can manually select a long focus mode or a short focus mode. The long focus mode is usually used to capture distant objects with small viewing range, and the short focus mode (commonly known as wide-angle mode) is usually used to capture nearby objects with large viewing range. When the user selects a required capturing mode, a processor of the mobile phone will send a control command. After receiving the control command, the first driving chip 161 starts to control the second lens assembly 13 and the third lens assembly 14 to move relative to the first lens assembly 12 along the optical axis O, thereby to realize the switching of the zoom lens 10 between the first target focal length and the second target focal length. The first target focal length may be in the short focus state, and the second target focal length may be in the long focal state.

Specifically, the first control end 1611 outputs a current signal to control a current inputted into the first coil 1621. When the first coil 1621 is energized, a Lorentz force is generated between the first coil 1621 and the first magnet 1622. When the Lorentz force is greater than the static friction between the second lens assembly 13 and the slide rail, the first magnet 1622 is pushed by the Lorentz force to drive the second lens assembly 13 to move along the first slide rail 1113 and the second slide rail 1114. The first control end 1611 can control the direction of the Lorentz force by controlling the direction of the current inputted into the first coil 1621, and thereby the second lens assembly 13 moves in the X direction or the opposite direction of the X direction. With the change of the current signal outputted by the first driving chip 161, the current inputted into the first coil 1621 changes at the same time, the second lens assembly 13 can move in a fixed moving distance range (hereinafter referred to as a first moving distance range. For example, the first moving distance range is section AB of the slide rail in FIG. 9a and FIG. 9b, which is [0 µm, 4096 µm]). As the current inputted in first coil 1621 changes, the moving distance of the second lens assembly 13 also changes, in which a corresponding relationship of the moving distance S (unit: µm) with current I (unit: milliampere (ma)) is shown in FIG. 10. The moving distance corresponding to position A is 0 µm and the moving distance corresponding to position B is 4096 µm. It can be understood that when the use state of the mobile phone is different, the Lorentz force required to move the second lens assembly 13 is different, and the corresponding current required is also different. For example, when the mobile phone is in the vertical state (i.e., perpendicular to the ground), if the second lens assembly 13 moves in the direction close to the ground (i.e., the opposite direction of the X direction), the Lorentz force F1 plus the gravity of the second lens assembly 13 is greater than the static friction between the second lens assembly 13 and the slide rail to drive the second lens assembly 13 to move. At this time, the required Lorentz force F1 is small, as shown in curve S1 in FIG. 10. When the moving distance of the second lens assembly 13 begins to change, the corresponding current I1 is small. When the second lens assembly 13 moves away from the ground (i.e., the X direction), the Lorentz force F2 is greater than the gravity of the second lens assembly 13 plus the static friction between the second lens assembly 13 and the slide rail to drive the second lens assembly 13 to move. At this time, the required Lorentz force F2 is large, as shown in curve S3 in FIG. 10. When the moving distance of the second lens assembly 13 begins to change, the corresponding current I2 is large. When the mobile phone is in a horizontal state (i.e., parallel to the ground), the second lens assembly 13 moves in the X direction or the opposite direction of the X direction, it only needs that the Lorentz force F3 is greater than the static friction between the second lens assembly 13 and the slide rail. At this time, the required Lorentz force F3 is located between the Lorentz force F1 and the Lorentz force F2, as shown in curve S2 in FIG. 10, When the moving distance of the second lens assembly 13 begins to change, the corresponding current I3 is located between the current I1 and the current I2. In this way, the moving distance of the second lens assembly 13 can be controlled by controlling the current inputted into the first coil 1621 through the first control end 1611.

The second control end 1612 outputs a current signal to control a current inputted into the second coil 1631. When the second coil 1631 is energized, a Lorentz force is generated between the second coil 1631 and the second magnet. When the Lorentz force is greater than the static friction between the third lens assembly 14 and the slide rail, the second magnet is pushed by the Lorentz force to drive the third lens assembly 14 to move along the first slide rail and the second slide rail, the second control end 1612 can control the direction of the Lorentz force by controlling the direction of the current inputted into the second coil 1631, thereby the third lens assembly 14 moves in the X direction or the opposite direction of the X direction. With the change of the current signal outputted by the first driving chip 161, the current inputted into the second coil 1631 changes at the same time, the third lens assembly 14 can move in a fixed moving distance range (hereinafter referred to as the second moving distance range. For example, the second moving distance range is the section CD of the slide rail in FIG. 9a, which is [0 μm, 4096 μm]), as the current inputted in the second coil 1631 changes, the moving distance of the third lens assembly 14 also changes. The corresponding relationship between a moving distance and a current is shown in FIG. 10, the moving distance corresponding to position C is 0 μm, and the moving distance corresponding to position D is 4096 μm. It can be understood that when the use state of the mobile phone is different, the Lorentz force required to move the third lens assembly 14 is different, and the corresponding current is also different. Since the changes of the Lorentz force and corresponding current required to move the third lens assembly 14 are basically the same as the changes of the Lorentz force and the corresponding current required to move the second lens assembly 13, please refer to the above description for specific explanation, which will not be repeated here. In this way, the moving distance of the third lens assembly 14 can be controlled by controlling the current inputted into the second coil 1631 through the second control end 1612.

In the long focus state and the short focus state, the second lens assembly 13 and the third lens assembly 14 correspond to different moving distances respectively. For example, in the long focus state, the moving distances of the second lens assembly 13 and the third lens assembly 14 are p0 and m0, respectively. In the short focus state, the moving distances of the second lens assembly 13 and the third lens assembly 14 are p1 and m1 respectively, p0 and p1 are within the first moving distance range, and m0 and m1 are within the second moving distance range.

According to the current state of the mobile phone (such as vertical state or horizontal state) and the moving direction of the lens assembly (such as the second lens assembly 13 and the third lens assembly 14), a mapping curve of the moving distance S and the current I can be determined. For example, when the mobile phone is in the horizontal state, the currents I4 and I5 corresponding to p0 and p1 and the currents I6 and I7 corresponding to m0 and m1 can be determined according to the mapping curve S2. For example, the second lens assembly 13 is initially in position A, the third lens assembly 14 is initially located at position C. The first control end 1611 controls the current inputted into the first coil 1621 to be I4, and the second control end 1612 controls the current inputted into the second coil 1631 to be I6, which can move the second lens assembly 13 to position p0 and the third lens assembly 14 to position m0, thereby to switch the zoom lens 10 to the long focus state. Similarly, the second lens assembly 13 is initially at position A, and the third lens assembly 14 is initially at position C. The first control end 1611 controls the current inputted into the first coil 1621 to be I5, and the second control end 1612 controls the current inputted into the second coil 1631 to be I7, which can move the second lens assembly 13 to position p1 and the third lens assembly 14 to position m1, and thereby to switch the zoom lens 10 to the short focus state.

In an embodiment of the present disclosure, a first axial spacing z11 between the first lens group 122 and the second lens group 132 when the zoom lens 10 is in the short focus state (as shown in FIG. 7*a*) is greater than a first axial spacing z12 between the first lens group 122 and the second lens group 132 when the zoom lens 10 is in the long focus state (as shown in FIG. 7*b*). A second axis spacing z21 between the second lens group 132 and the third lens group 142 when the zoom lens 10 is in the short focus state is greater than a second axis spacing z22 between the second lens group 132 and the third lens group 142 when the zoom lens 10 is in the long focus state. That is, when the zoom lens 10 changes from the short focus state to the long focus state, the second lens group 132 moves close to the first lens group 122 (the first axis spacing decreases), the third lens group 142 moves close to the second lens group 132, and the second axis spacing decreases. In other embodiments, the first axis spacing z11 when the zoom lens 10 is in the short focus state is less than the first axis spacing z12 when the zoom lens 10 is in the long focus state, and the second axis spacing z21 when the zoom lens 10 is in the short focus state is less than the second axis spacing z22 when the zoom lens 10 is in the long focus state. In at least one alternative embodiment, the first axis spacing z11 when the zoom lens 10 is in the short focus state is less than the first axis spacing z12 when the zoom lens 10 is in the long focus state, the second axis spacing z21 when the zoom lens 10 is in the short focus state is greater than the second axis spacing z22 when the zoom lens 10 is in the long focus state, etc. When the zoom lens 10 is switched from the short focus state to the long focus state, variation trends of the first axis spacing z1 and the second axis spacing z2 can be determined according to parameters (such as surface parameters, aspherical coefficient parameters, etc.) of the first lens group 122 to the third lens group 142, which will not be listed one by one here.

It can be understood that the variation range of the focal length of the zoom lens 10 is different according to decreasing ranges of the first axis spacing and the second axis spacing. For example, the focal length of the zoom lens 10 gradually increases as the first axis spacing and the second axis spacing gradually decrease. For another example, as the first axis spacing and the second axis spacing gradually decrease, the focal length of the zoom lens 10 gradually increases, etc. In this embodiment, as the first axis spacing and the second axis spacing gradually decrease, the focal length of the zoom lens 10 gradually increases. In this way, the zoom lens 10 can control a gradual change of a multiple of the focal length. For example, with the gradual decreases of the first axis spacing and the second axis spacing, the focal length gradually changes from one time of the initial focal length to 10 times of the initial focal length (the initial focal length is the focal length when the zoom lens 10 is in the short focus state), therefore the zoom lens 10 can achieve 10 times optical zoom.

It can be understood that during the zooming, the moving distance ranges of the second lens assembly 13 and the third lens assembly 14 are large, due to the limitation of the effective control bits of the first driving chip 161, the moving accuracy of the second lens assembly 13 and the third lens assembly 14 controlled by the first control end 1611 and the second control end 1612 during the zooming will be lower than the accuracy required for focusing. After the zooming is completed, high precision focusing can be carried out to ensure accurate focal length adjustment of the zoom lens 10, and thereby to improve the imaging quality.

After the zoom lens 10 completes the zooming, the mobile phone can obtain the image of the subject through the camera module 100, and judge whether a definition of the image reaches a preset definition in real time. The definition of the image can be obtained by calculating a contrast ratio of the image. During the capturing image, the light successively passes through the light inlet 1131 of the cover plate 113, the light inlet through hole 153 of the prism assembly 15, is reflected by the reflecting surface 157 of the prism 152, and is emitted from the light outlet through hole 154. Then, the light successively passes through the light inlet 123, the first lens group 122, and the light outlet 124 of the first lens assembly 12, the first light inlet 135, the second lens group 132, and the first light outlet 136 of the second lens assembly 13, and the second light inlet 145, the third lens group 142 and the second light outlet 146, reaches the photosensitive element 50 for capturing image.

In response to the definition of the image does not reach the preset definition, it means that the focal length at this time cannot make the subject clear imaging. At this time, the focusing is required. The focusing is to slightly adjust the focal length, compared with the large-scale adjustment of the focal length, the focusing will not change the current state (such as short focus state or long focus state) of the zoom lens 10.

Figure 9A:
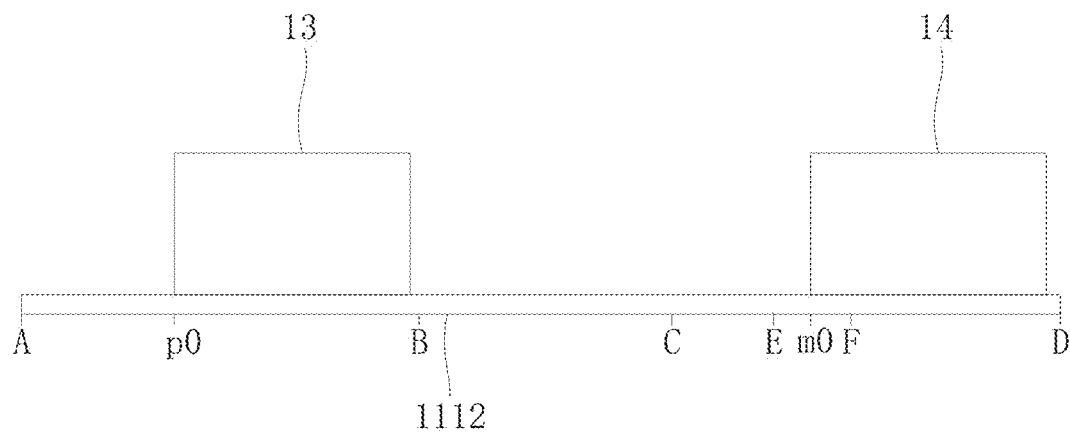
FIG. 9a and FIG. 9b illustrate schematic views of positions of a second lens assembly and a third lens assembly in different focal length states applicable to some embodiments.
Figure 10:
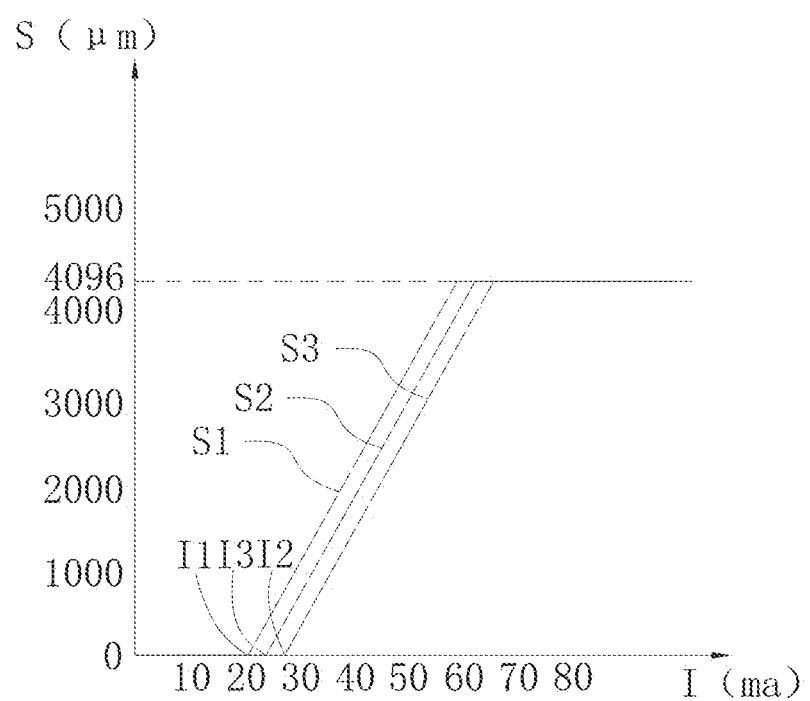
FIG. 10 illustrates a schematic view of a relationship between a moving distance and a current of the second lens assembly and the third lens assembly of the zoom lens applicable to some embodiments.

During the focusing, for example, the zoom lens 10 is in a short focus state (i.e., as shown in FIG. 9a, the second lens assembly 13 is located at position p0 and the third lens assembly 14 is located at position m0), and the third control end 1613 controls the current inputted to the second coil 1631 to make the third lens group starts moving with p0 as the starting position and moves with the minimum moving accuracy (e.g., 0.5 μm) each time. For example, the moving distance range of the focusing is [0 μm, 512 μm] (as shown in FIG. 9a, position E and position F respectively correspond to 0 μm and 512 μm, position m0 corresponds to 256 μm), the third control end 1613 can control the third lens assembly 14 to move in the X direction every time (i.e., move 0.5 μm). That is, obtaining the definition of the image of the subject once and judging whether the definition reaches the preset definition. If the definition does not reach the preset definition until it moves to the position E, controlling the third lens assembly 14 to quickly move to the position m0 (for example, controlling the current inputted into the second coil 1631 just to make the third lens assembly 14 move 256 μm in the opposite direction of the X direction), and the third lens assembly 14 is controlled to continue moving to the position F in the opposite direction of the X direction until the definition of the image of the subject reaches the preset definition. At this time, the third control end 1613 controls the third lens assembly 14 to stop moving.

Figure 9B:
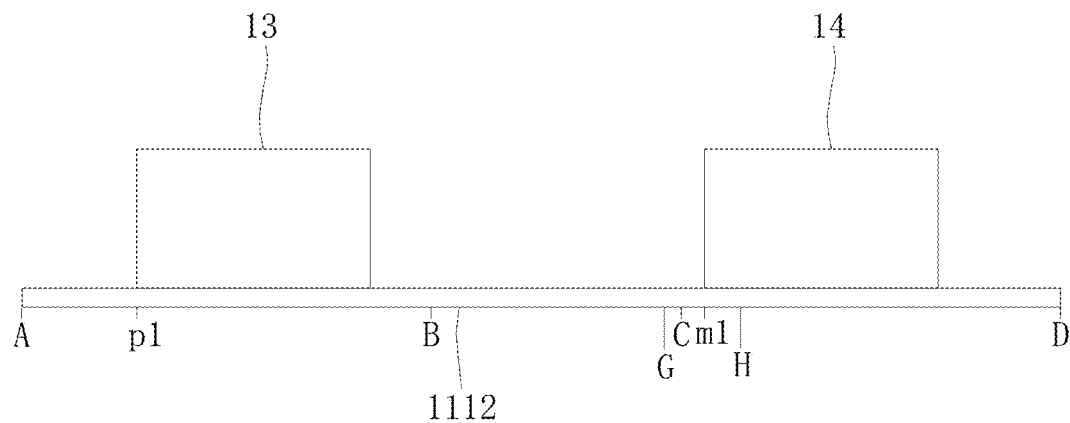

During the focusing, for example, the zoom lens 10 is in the long focus state (i.e., as shown in FIG. 9b, the second lens assembly 13 is at position p1 and the third lens assembly 14 is at position m1), and the fourth control end 1614 controls the current inputted into the second coil 1631 to make the third lens group starts moving with p1 as the starting position and moves with the minimum moving accuracy (e.g., 0.5 μm) each time. For example, the moving distance range of the focusing is [0 μm, 512 μm] (as shown in FIG. 9b, position G and position H respectively correspond to 0 μm and 512 μm, position m1 corresponds to 256 μm), the fourth control end 1614 can control the third lens assembly 14 to move in the X direction every time (i.e., move 0.5 μm). That is, obtaining the definition of the image of the subject once and judging whether the definition reaches the preset definition. If the definition does not reach the preset definition until it moves to the position G, controlling the third lens assembly 14 to quickly move to the position m1 (for example, controlling the current inputted to the second coil 1631 just to make the third lens assembly 14 move 256 μm in the opposite direction of the X direction). Then, the third lens assembly 14 is controlled to continue to move to the position H in the opposite direction of the X direction until the definition of the image of the subject reaches the preset definition. At this time, the fourth control end 1614 controls the third lens assembly 14 to stop moving. In this way, the focusing of the zoom lens 10 in the short focus state and the long focus state can be accurately completed, and since the moving distance range during the focusing in the short focus state and the long focus state is small, the effective control bits of the first driving chip 161 are less (such as 10 bits), and the high-precision movement of the third lens assembly 14 can be controlled (at least 0.5 μm can be moved each time), and thereby to ensure the accuracy of focusing.

During the capturing images with the mobile phone, because the user generally does not use a stabilizer (such as a handheld stabilizer, etc.), the user's hand shake may cause the zoom lens 10 to be affected by the shake and make the captured image blurred. The mobile phone is generally equipped with a gyroscope to detect the user shake. After obtaining the user shake data, the processor can generate a corresponding movement control command and send it to the second driving chip 166. The second driving chip 166 controls the motor 1641 to drive the connecting frame 1642 to move in the first direction through the fourth control end 1661 and the fifth control end 1662 to drive the zoom lens 10 to move in the first direction, and controls the motor 1641 to drive the connecting frame 1642 to move in the second direction to drive the zoom lens 10 to move in the second direction, and thereby to offset the impact of user shake on capturing images and realize the optical image stabilization.

Figure 11:
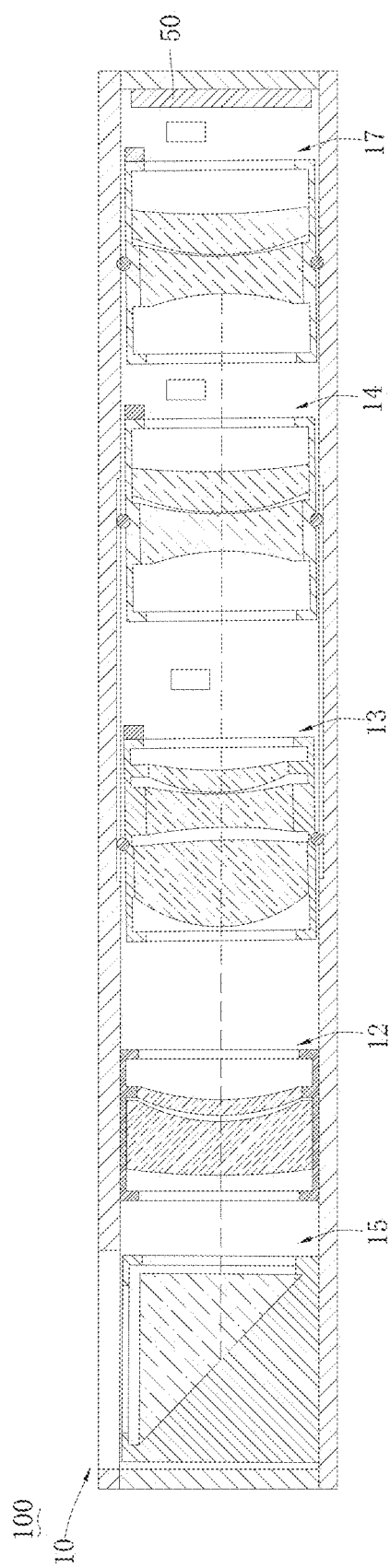
FIG. 11 illustrates a schematic cross-sectional view of a zoom lens cut by a section line corresponding to the line VI-VI in FIG. 3 applicable to some embodiments.

Referring to FIGS. 5 and 11, in some embodiments, the zoom lens 10 further includes a fourth lens assembly 17 arranged in the housing 11, and the second driving chip 166 further includes a fifth control end 1663 configured to control the fourth lens group 17 to move relative to the first lens group 12 along the optical axis O.

Specifically, in order to change the focal length in a wider range, such as 50 times optical zoom, the zoom lens 10 can be provided with a movable fourth lens assembly 17. The first lens assembly 12, the second lens assembly 13, the third lens assembly 14 and the fourth lens assembly 17 are arranged in sequential order along the optical axis O. The fourth lens assembly 17 is controlled to move in the X direction or the opposite direction of the X direction through the fifth control end 1663, and thereby to achieve a larger range change of focus length.

Figure 12:
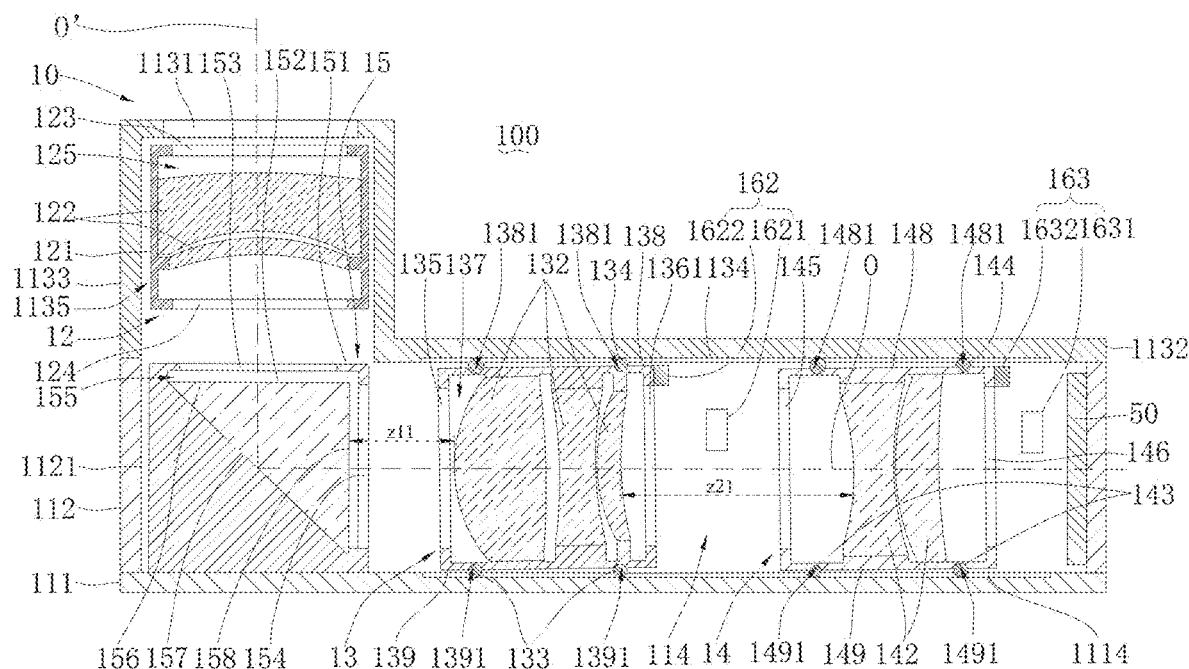
FIG. 12 illustrates a schematic cross-sectional view of the zoom lens along an XI-XI line in FIG. 3.

Referring to FIG. 12, in some embodiments, the cover plate 113 may also include a cover plate body 1132 and a boss 1133, the boss 1133 is connected to the cover plate body 1132, the first lens assembly 12 is arranged in the boss 1133, and the first lens group 122 of the first lens assembly 12 is opposite to the incident surface 156 of the prism 152.

Specifically, the boss 1133 is provided with a mounting space 1135, the mounting space 1135 is connected to the receiving space 114, the first lens assembly 12 is arranged in the mounting space 1135, and the first lens assembly 12 forms an optical axis O', which is perpendicular to the optical axis O. The first lens assembly 12 can be installed in the mounting space 1135 by gluing, screwing, clamping, etc., and the first lens assembly 12 can also be integrally formed with the boss 1133. The end face of the boss 1133 facing away from the prism assembly 15 is provided with an optical inlet 1131, and the depth direction of the optical inlet 1131 can be parallel to the optical axis O', and thus the camera module 100 has a periscopic structure as a whole. The light inlet 1131 is opposite to the light inlet hole 123 of the first housing 121, and the light outlet hole 124 is opposite to the light inlet through hole 153 of the prism assembly 15. In this way, the length of the zoom lens 10 in a certain direction (such as the X direction) can be reduced.

Referring to FIGS. 4, 7a and 7b, in some embodiments, the first top surface 138 is provided with a second groove 1381, and the second lens assembly 13 includes a second ball 134, which is arranged in the second groove 1381 and in contact with the cover plate 113.

Specifically, the second groove 1381 matches a shape of the second ball 134. For example, the second ball 134 is spherical and has low moving resistance, the second groove 1381 is a semicircular groove, and a diameter of the second ball 134 is equal to that of the second groove 1381, that is, a half of the second ball 134 is located in the second groove 1381. The second ball 134 and the second groove 1381 are closely combined. When the second ball 134 moves, it can drive the second housing 131 of the second lens assembly 13 to move. A number of the second groove 1381 is one or more. For example, the number of the second groove 1381 is one, two, three, four, or even more. In this embodiment, the number of the second groove 1381 is three. A number of the second ball 134 may also be one or more. In this embodiment, the number of the second ball 134 is the same as the number of the second groove 1381, and there are also three. The three second grooves 1381 are spaced on the first top surface 138 of the second housing 131. The second ball 134 is arranged in the second groove 1381 and in contact with the cover plate 113, the second lens assembly 13 is limited between the cover plate 113 and the base plate 111, which can prevent the second lens assembly 13 from shaking or tilting in the Z direction, thereby to ensure that the imaging quality is not affected.

Referring to FIGS. 4, 7a and 7b, in some embodiments, a slideway 1134 is formed on the surface of the cover plate 113 opposite the first top surface 138, and the second ball 134 is arranged in the second groove 1381 and in contact with the bottom of the slideway 1134.

Specifically, the slideway 1134 may be a groove with an extension direction parallel to the X direction formed on the surface of the cover plate 113 opposite to the first top surface 138, the slideway 1134 may also be a bump with an extension direction parallel to the X direction arranged on the surface opposite to the first top surface 138 of the cover plate 113, and a groove matched with the second ball 134 is formed on the surface of the bump opposite to the first top surface 138 of the second housing 131. In this embodiment, the slideway 1134 is a groove with the extension direction parallel to the X direction formed on the surface of the cover plate 113 opposite to the first top surface 138. After the second lens assembly 13 is installed in the receiving space 114, a part of the second ball 134 is located in the slideway 1134 and in contact with the bottom of the slideway 1134. The shape of the inner wall of the slideway 1134 cut by the plane perpendicular to the X direction is a third arc, the outer contour of the second ball 134 cut by the plane perpendicular to the X direction is a fourth arc, and the curvature of the third arc is the same as that of the fourth arc. Thus, in the Y direction, the outer wall of the second ball 134 is closely combined with the inner wall of the slideway 1134, and the opposite sides of the outer wall of the second ball 134 are in contact with the opposite sides of the inner wall of the slideway 1134.

A number of the slideway 1134 can be determined according to the position of the three second grooves 1381. For example, if the connecting line of the three second grooves 1381 is parallel to the optical axis O, only one slideway 1134 needs to be set. For another example, the three second grooves 1381 are divided into two groups (hereinafter referred to as a fifth group and a sixth group). The fifth group includes one second groove 1381, the sixth group includes two second grooves 1381, and the second groove 1381 of the fifth group is not on the connecting line of the two second grooves 1381 of the sixth group (that is, the three second grooves 1381 can form a triangle), two slideways 1134 are required to correspond to the fifth group and the sixth group respectively. In this embodiment, the three second grooves 1381 are divided into the fifth group and the sixth group. The fifth group includes one second groove 1381, the sixth group includes two second grooves 1381, and the number of the slideway 1134 is two (hereinafter referred to as the first slideway 1157 and the second slideway 1158). The fifth group corresponds to the first slideway 1157, and the sixth group corresponds to the second slideway 1158. In this way, the second ball 134 corresponding to the fifth group slides in the first slideway 1157, the second balls 134 corresponding to the sixth group slide in the second slideway 1158, the second ball 134 corresponding to the fifth group and the second balls 134 corresponding to the sixth group are limited in the first slideway 1157 and the second slideway 1158 respectively, and the three second balls 134 form a triangle to minimize the number of the second ball 134, on the premise of ensuring sliding stability, it can reduce the sliding resistance. Moreover, in the Y direction, the opposite sides of the outer wall of the second ball 134 corresponding to the fifth group are in contact with the opposite sides of the inner wall of the first slideway 1157, and the opposite sides of the outer wall of each second ball 134 corresponding to the sixth group are in contact with the opposite sides of the inner wall of the second slideway 1158. The three second balls 134 form a triangle, which can prevent the second lens assembly 13 from shaking or tilting in the Y direction, thus, the imaging quality of the camera module 100 is not affected.

Referring to FIGS. 4, 7a and 7b, in some embodiments, the second top surface 148 is provided with a fourth groove 1481, and the third lens assembly 14 includes a fourth ball 144, which is arranged in the fourth groove 1481 and in contact with the cover plate 113.

Specifically, the fourth groove 1481 matches a shape of the fourth ball 144. For example, the fourth ball 144 is spherical and has low moving resistance, the fourth groove 1481 is a semicircular groove, and a diameter of the fourth ball 144 is equal to that of the fourth groove 1481, that is, a half of the fourth ball 144 is located in the fourth groove 1481. The fourth ball 144 and the fourth groove 1481 are closely combined. When the fourth ball 144 moves, it can drive the third housing 141 of the third lens assembly 14 to move. A number of the fourth groove 1481 is one or more. For example, the number of the fourth groove 1481 is one, two, three, four, or even more. In this embodiment, the number of the fourth groove 1481 is three. A number of the fourth ball 144 may also be one or more. In this embodiment, the number of the fourth ball 144 is the same as the number of the fourth groove 1481, and there are also three. The three fourth grooves 1481 are spacing on the top surface 148 of the third housing 141. The fourth ball 144 is arranged in the fourth groove 1481 and in contact with the cover plate 113, the third lens assembly 14 is limited between the cover plate 113 and the base plate 111, which can prevent the third lens assembly 14 from shaking or tilting in the Z direction, and thereby to ensure that the imaging quality is not affected.

Referring to FIGS. 4, 7a and 7b, in some embodiments, a slideway 1134 is formed on the surface of the cover plate 113 opposite the second top surface 148, and the fourth ball 144 is arranged in the fourth groove 1481 and in contact with the bottom of the slideway 1134.

After the third lens assembly 14 is installed in the receiving space 114, a part of the fourth ball 144 is located in the slideway 1134 and in contact with the bottom of the slideway 1134. The shape of the inner wall of the slideway 1134 cut by the plane perpendicular to the X direction is a third arc, the outer contour of the fourth ball 144 cut by the plane perpendicular to the X direction is a fourth arc, and the curvature of the third arc is the same as that of the fourth arc. In the Y direction, the outer wall of the fourth ball 144 is closely combined with the inner wall of the slideway 1134, and the opposite sides of the outer wall of the fourth ball 144 are in contact with the opposite sides of the inner wall of the slideway 1134.

In this embodiment, the three fourth grooves 1481 are divided into a seventh group and an eighth group. The seventh group includes one fourth groove 1481, the eighth group includes two fourth grooves 1481, the seventh group corresponds to the first slideway 1157, and the eighth group corresponds to the second slideway 1158. In this way, the fourth ball 144 corresponding to the seventh group slides in the first slideway 1157, the fourth balls 144 corresponding to the eighth group slide in the second slideway 1158, the fourth ball 144 corresponding to the seventh group and the fourth balls 144 corresponding to the eighth group are limited in the first slideway 1157 and the second slideway 1158 respectively, and the three fourth balls 144 form a triangle, and thereby to minimize the number of the fourth ball 144 on the premise of ensuring sliding stability, it can reduce the sliding resistance. Moreover, in the Y direction, the opposite sides of the outer wall of the fourth ball 144 corresponding to the seventh group are in contact with the opposite sides of the inner wall of the first slideway 1157, and the opposite sides of the outer wall of each fourth ball 144 corresponding to the eighth group are in contact with the opposite sides of the inner wall of the second slideway 1158. The three fourth balls 144 form a triangle, which can prevent the second lens assembly 13 from shaking or tilting in the Y direction, thus, the imaging quality of the camera module 100 is not affected.

In the description of this specification, the description referring to the terms "some embodiments", "an embodiment", "one embodiments", "illustrated embodiments", "examples", "specific examples", or "some examples" means that the specific features, structures, materials or characteristics described in combination with the embodiments or examples are included in at least one embodiment or example of the present disclosure. In this specification, the schematic expression of the above terms does not necessarily refer to the same embodiment or example. Further, the specific features, structures, materials or characteristics described may be combined in a suitable manner in any one or more embodiments or examples.

In addition, the terms "first" and "second" are only used for descriptive purposes and cannot be understood as indicating or implying relative importance or implicitly indicating the number of indicated technical features. Thus, the features defined with "first" and "second" can include at least one feature explicitly or implicitly. In the description of the present disclosure, "a plurality of" means at least two, such as two or three, unless otherwise expressly and specifically defined.

Although the embodiments of the present disclosure have been shown and described above, it can be understood that the above embodiments are exemplary and cannot be understood as restrictions on the present disclosure. Those skilled in the art can change, amend, replace and modify the above embodiments within the scope of the present disclosure. The scope of the present disclosure is limited by the claims and their equivalents.

What is claimed is:

1. A zoom lens, comprising:
   a housing;
   a first lens assembly, a second lens assembly and a third lens assembly, wherein the first lens assembly, the second lens assembly and the third lens assembly are arranged in the housing in sequential order along an optical axis of the first lens assembly; and
   a first driving chip, comprising: a first control end, a second control end, a third control end and a fourth control end;
   wherein the first control end is configured to control the second lens assembly to move relative to the first lens assembly along the optical axis to realize zooming of the zoom lens, and the second control end is configured to control the third lens assembly to move relative to the first lens assembly along the optical axis to realize zooming of the zoom lens; and
   wherein the third control end is configured to control the third lens assembly to move relative to the first lens assembly along the optical axis under a first target focal length in a short focal state to realize focusing of the zoom lens, the fourth control end is configured to control the third lens assembly to move relative to the first lens assembly along the optical axis under a second target focal length in a long focal state to realize focusing of the zoom lens, and the first target focal length is different from the second target focal length;
   a moving accuracy of the third lens assembly during the focusing is higher than a moving accuracy of each of the second lens assembly and the third lens assembly during the zooming, and a travel range of the third lens assembly during the focusing is less than a travel range of each of the second lens assembly and the third lens assembly during the zooming.

2. The zoom lens according to claim 1, wherein the housing comprises a base plate, and the base plate comprises a bearing surface; the zoom lens further comprises a second driving chip and a prism assembly; and the prism assembly, the first lens assembly, the second lens assembly and the third lens assembly are arranged on the bearing surface in sequential order along the optical axis; and
   wherein the second driving chip is configured to control the prism assembly to move in a first direction and a second direction, thereby to realize optical image stabilization; and every two of the optical axis, the first direction and the second direction are perpendicular to each other.

3. The zoom lens according to claim 2, wherein the first direction is parallel to the bearing surface and perpendicular to the optical axis, the second direction is perpendicular to the bearing surface, and the bearing surface is parallel to the optical axis.

4. The zoom lens according to claim 2, wherein a number of effective control bits of each of the first driving chip and the second driving chip is greater than or equal to 10, and a minimum moving unit of each of the second lens assembly and the third lens assembly meets a moving accuracy of 0.5 µm.

5. The zoom lens according to claim 2, wherein the zoom lens further comprises a fourth lens assembly arranged in the housing, the second driving chip further comprises a fifth control end, and the fifth control end is connected to the fourth lens assembly and configured to control the fourth lens assembly to move relative to the first lens assembly along the optical axis.

6. The zoom lens according to claim 2, wherein the zoom lens comprises an anti-shake driving component, the second driving chip comprises a first anti-shake control end and a second anti-shake control end, the first anti-shake control end and the second anti-shake control end are connected to the anti-shake driving component, and the anti-shake driving component is connected to the prism assembly;
 wherein the first anti-shake control end is configured to control the anti-shake driving component to move and thereby to drive the prism assembly to move in the first direction; and
 wherein the second anti-shake control end is configured to control the anti-shake driving component to move and thereby to drive the prism assembly to move in the second direction.

7. The zoom lens according to claim 6, wherein the prism assembly comprises a prism, and the prism comprises an incident surface, a reflecting surface and an emitting surface connected in sequence; and
 wherein the first lens assembly is opposite to one of the incident surface and the emitting surface, and the reflecting surface is configured to reflect light incident into the incident surface to make the light exit from the emitting surface.

8. The zoom lens according to claim 1, wherein the zoom lens further comprises a first driving component and a second driving component;
 wherein the first control end is connected to the second lens assembly through the first driving component, and the first control end is configured to control the first driving component to move and thereby to drive the second lens assembly to move relative to the first lens assembly along the optical axis; and
 wherein the second control end, the third control end and the fourth control end are connected to the second driving component, the second driving component is connected to the third lens assembly, and the second control end, the third control end and the fourth control end are configured to control the second driving component to move and thereby to drive the third lens assembly to move relative to the first lens assembly along the optical axis.

9. The zoom lens according to claim 8, wherein the first driving component comprises a first coil and a first magnet, the second driving component comprises a second coil and a second magnet, the first magnet is connected to the second lens assembly, and the second magnet is connected to the third lens assembly;
 wherein the first control end is connected to the first coil, and the first control end is configured to control a current inputted to the first coil and thereby to drive the first magnet to drive the second lens assembly to move relative to the first lens assembly along the optical axis; and
 wherein the second control end, the third control end and the fourth control end are connected to the second coil, and the second control end, the third control end and the fourth control end are configured to control a current inputted to the second coil and thereby to drive the second magnet to drive the third lens assembly to move relative to the first lens assembly along the optical axis.

10. The zoom lens according to claim 1, wherein the housing comprises a base plate, a bearing surface of the base plate is provided with two slide rails, a surface of each of the second lens assembly and the third lens assembly opposite to the bearing surface is provided with three balls, the balls of each of the second lens assembly and the third lens assembly are slidably connected to the slide rails and thereby the second lens assembly and the third lens assembly are movable relative to the first lens assembly along the optical axis; the three balls of each of the second lens assembly and the third lens assembly define a triangle; the two slide rails comprise a first slide rail and a second slide rail, an extension direction of each of the first slide rail and the second slide rail is parallel to the optical axis; in the optical axis, a first distance between an end of the first slide rail close to the first lens assembly and the first lens assembly is greater than a second distance between an end of the second slide rail close to the first lens assembly and the first lens assembly, and a third distance between another end of the first slide rail facing away from the first lens assembly and the first lens assembly is less than a fourth distance between another end of the second slide rail facing away from the first lens assembly and the first lens assembly.

11. The zoom lens according to claim 1, wherein the third control end is further configured to control the third lens assembly to stop moving in response to a definition of an image captured by the zoom lens reaches a preset definition, under the first target focal length;
 wherein the fourth control end is further configured to control the third lens assembly to stop moving in response to a definition of an image captured by the zoom lens reaches the preset definition, under the second target focal length.

12. A camera module, comprising:
 a photosensitive element and a zoom lens;
 wherein the photosensitive element is arranged on an image side of the zoom lens; and
 wherein the zoom lens comprises:
  a housing;
  a first lens assembly, a second lens assembly and a third lens assembly; and the first lens assembly, the second lens assembly and the third lens assembly being arranged in the housing in sequential order along an optical axis of the first lens assembly; and
  a first driving chip, comprising: a first control end, a second control end, a third control end and a fourth control end;
  wherein the first control end is configured to control the second lens assembly to move relative to the first lens assembly along the optical axis to realize zooming of the zoom lens and the second control end is configured to control the third lens assembly to move relative to the first lens assembly along the optical axis to realize zooming of the zoom lens; and
  wherein the third control end is configured to control the third lens assembly to move relative to the first lens assembly along the optical axis under a first target focal length in a short focal state to realize focusing of the zoom lens, the fourth control end is configured to control the third lens assembly to move relative to the first lens assembly along the optical axis under a second target focal length in a long focal state to realize focusing of the zoom lens, and the first target focal length is different from the second target focal length,
  a moving accuracy of the third lens assembly during the focusing is higher than a moving accuracy of each of the second lens assembly and the third lens assembly during the zooming, and a travel range of the third lens assembly during the focusing is less than a travel range of each of the second lens assembly and the third lens assembly during the zooming.

13. The camera module according to claim 12, wherein the housing comprises a base plate, and the base plate comprises a bearing surface; the zoom lens further comprises a second driving chip and a prism assembly; and the prism assembly, the first lens assembly, the second lens assembly and the third lens assembly are arranged on the bearing surface in sequential order along the optical axis; and wherein the second driving chip is configured to control the prism assembly to move in a first direction and a second direction, thereby to realize optical image stabilization; and every two of the optical axis, the first direction and the second direction are perpendicular to each other.

14. The camera module according to claim 13, wherein the first direction is parallel to the bearing surface and perpendicular to the optical axis, the second direction is perpendicular to the bearing surface, and the bearing surface is parallel to the optical axis;

wherein a number of effective control bits of each of the first driving chip and the second driving chip is greater than or equal to 10, and a minimum moving unit of each of the second lens assembly and the third lens assembly meets a moving accuracy of 0.5 µm; or wherein the zoom lens further comprises a fourth lens assembly arranged in the housing, the second driving chip further comprises a fifth control end, and the fifth control end is connected to the fourth lens assembly and configured to control the fourth lens assembly to move relative to the first lens assembly along the optical axis.

15. The camera module according to claim 13, wherein the zoom lens comprises an anti-shake driving component, the second driving chip comprises a first anti-shake control end and a second anti-shake control end, the first anti-shake control end and the second anti-shake control end are connected to the anti-shake driving component, and the anti-shake driving component is connected to the prism assembly; and wherein the first anti-shake control end is configured to control the anti-shake driving component to move and thereby to drive the prism assembly to move in the first direction; and wherein the second anti-shake control end is configured to control the anti-shake driving component to move and thereby to drive the prism assembly to move in the second direction.

16. The camera module according to claim 15, wherein the prism assembly comprises a prism, and the prism comprises an incident surface, a reflecting surface and an emitting surface connected in sequence; and wherein the first lens assembly is opposite to one of the incident surface and the emitting surface, and the reflecting surface is configured to reflect light incident into the incident surface to make the light exit from the emitting surface.

17. The camera module according to claim 13, wherein the zoom lens further comprises a first driving component and a second driving component;

wherein the first control end is connected to the second lens assembly through the first driving component, and the first control end is configured to control the first driving component to move and thereby to drive the second lens assembly to move relative to the first lens assembly along the optical axis; and wherein the second control end, the third control end and the fourth control end are connected to the second driving component, the second driving component is connected to the third lens assembly, and the second control end, the third control end and the fourth control end are configured to control the second driving component to move and thereby to drive the third lens assembly to move relative to the first lens assembly along the optical axis.

18. The camera module according to claim 17, wherein the first driving component comprises a first coil and a first magnet, the second driving component comprises a second coil and a second magnet, the first magnet is connected to the second lens assembly, and the second magnet is connected to the third lens assembly;

wherein the first control end is connected to the first coil, and the first control end is configured to control a current inputted to the first coil and thereby to drive the first magnet to drive the second lens assembly to move relative to the first lens assembly along the optical axis; and wherein the second control end, the third control end and the fourth control end are connected to the second coil, and the second control end, the third control end and the fourth control end are configured to control a current inputted to the second coil and thereby to drive the second magnet to drive the third lens assembly to move relative to the first lens assembly along the optical axis.

19. The camera module according to claim 12, wherein the housing comprises a base plate, a bearing surface of the base plate is provided with a slide rail, surfaces of the second lens assembly and the third lens assembly opposite to the bearing surface are provided with balls, the balls of the second lens assembly and the third lens assembly are slidably connected to the slide rail and thereby the second lens assembly and the third lens assembly are movable relative to the first lens assembly along the optical axis; or wherein the third control end is further configured to control the third lens assembly to stop moving in response to a definition of an image captured by the zoom lens reaches a preset definition, under the first target focal length; the fourth control end is further configured to control the third lens assembly to stop moving in response to a definition of an image captured by the zoom lens reaches the preset definition, under the second target focal length; and the first target focal length is in a short focal state, and the second target focal length is in a long focal state.

20. An electronic device, comprising:
a casing; and
a camera module; wherein the camera module is installed in the casing and comprises: a photosensitive element and a zoom lens, the photosensitive element is arranged on an image side of the zoom lens; and wherein the zoom lens comprises:
a housing;
a first lens assembly, a second lens assembly and a third lens assembly; and the first lens assembly, the second lens assembly and the third lens assembly being arranged in the housing in sequential order along an optical axis of the first lens assembly; and
a first driving chip, comprising: a first control end, a second control end, a third control end and a fourth control end;
wherein the first control end is configured to control the second lens assembly to move relative to the first lens assembly along the optical axis to realize zooming of the zoom lens and the second control end is configured to control the third lens assembly to move relative to the first lens assembly along the optical axis to realize zooming of the zoom lens; and wherein the third control end is configured to control the third lens assembly to move relative to the first lens assembly along the optical axis under a first target focal length in a short focal state to realize focusing of the zoom lens, the fourth control end is configured to control the third lens assembly to move relative to the first lens assembly along the optical axis under a second target focal length in a long focal state to realize focusing of the zoom lens, and the first target focal length is different from the second target focal length;

a moving accuracy of the third lens assembly during the focusing is higher than a moving accuracy of each of the second lens assembly and the third lens assembly during the zooming, and a travel range of the third lens assembly during the focusing is less than a travel range of each of the second lens assembly and the third lens assembly during the zooming.

* * * * *